US008266022B2

(12) United States Patent
Koester

(10) Patent No.: US 8,266,022 B2
(45) Date of Patent: Sep. 11, 2012

(54) RISK-COST ANALYSIS OF CURRENCY EXPOSURE REDUCTION FOR CURRENCY EXPOSURE MANAGEMENT

(75) Inventor: Wolfgang J. Koester, Paradise Valley, AZ (US)

(73) Assignee: Rim Tec Inc., Scottsdale, AZ (US)

( * ) Notice: Subject to any disclaimer, the term of this patent is extended or adjusted under 35 U.S.C. 154(b) by 215 days.

(21) Appl. No.: 12/895,345

(22) Filed: Sep. 30, 2010

(65) Prior Publication Data

US 2011/0082775 A1 Apr. 7, 2011

Related U.S. Application Data

(60) Provisional application No. 61/247,850, filed on Oct. 1, 2009.

(51) Int. Cl.
*G06Q 10/00* (2006.01)
(52) U.S. Cl. ........................................................ 705/30
(58) Field of Classification Search ...................... 705/30
See application file for complete search history.

(56) References Cited

U.S. PATENT DOCUMENTS

| | | | |
|---|---|---|---|
| 6,938,010 | B1 | 8/2005 | Everson et al. |
| 2007/0282726 | A1 | 12/2007 | Koester et al. |
| 2009/0037249 | A1 | 2/2009 | Edens et al. |
| 2010/0036775 | A1* | 2/2010 | Edens .......................... 705/36 R |

OTHER PUBLICATIONS

International Search Report and Written Opinion for International Patent Application No. PCT/US2010/051174, Mailed May 31, 2011, 8 pages.

* cited by examiner

*Primary Examiner* — Shay S Glass
(74) *Attorney, Agent, or Firm* — Blakely Sokoloff Taylor & Zafman LLP

(57) ABSTRACT

Methods and apparatuses enable companies to analyze potential foreign currency exposure reduction actions. Value-at-risk (VaR) for currency exposures and cost of potential exposure reduction actions are used to order currency exposures representing foreign currency exposure for a company. Currency exposures associated with negative cost actions are ordered based on a ratio of VaR to cost. Currency exposure associated with positive cost actions can also be ordered, either based on VaR or cost. An output representation of the VaR versus accumulated cost is generated from the ordered currency exposures. Additionally, a graphical representation of VaR versus accumulated cost can be generated from plot points based on the ordered currency exposures. The output representation, whether a table, list, or graph, allows comparing potential exposure reduction actions.

27 Claims, 13 Drawing Sheets

| CURR PAIR 210 | EXPOSURE 220 | | | HEDGE 230 | | | V/F % 242 | FX/RT 244 | INT/RT % 246 |
|---|---|---|---|---|---|---|---|---|---|
| | CURR1 222 | CURR2 224 | VAR 226 | CURR1 232 | CURR2 234 | COST 236 | | | |
| USD-CNY | (2,237,303) | 15,000,000 | 22,373 | 2,237,303 | (15,000,000) | 8,735 | 1.0 | 6.7045 | -4.320 |
| USD-THB | (13,084,724) | 400,000,000 | 1,805,692 | 13,084,724 | (400,000,000) | (6,869) | 13.8 | 30.57 | 0.995 |
| USD-CAD | (4,853,898) | 5,000,000 | 383,458 | 4,853,898 | (5,000,000) | (3,297) | 7.9 | 1.0301 | 1.180 |
| USD-SEK | 11,436,621 | (78,350,000) | 1,166,535 | (11,436,621) | 78,350,000 | 4,622 | 10.2 | 6.8508 | 0.850 |
| USD-RUB | (3,140,073) | 97,354,825 | 370,529 | 3,140,073 | (97,354,825) | (6,215) | 11.8 | 31.004 | 2.740 |
| USD-SGD | (4,904,550) | 6,500,000 | 176,564 | 4,904,550 | (6,500,000) | 61 | 3.6 | 1.3253 | 0.350 |
| USD-PHP | 5,161,185 | (225,853,462) | 252,898 | (5,161,185) | 225,853,462 | 10,021 | 4.9 | 43.76 | 2.695 |
| USD-HKD | (902,353) | 7,000,000 | 2,707 | 902,353 | (7,000,000) | 199 | 0.3 | 7.7575 | 0.100 |
| EUR-USD | 9,375,000 | (12,470,625) | 1,658,593 | (9,375,000) | 12,470,625 | (3,014) | 13.3 | 1.3302 | 0.655 |
| GBP-USD | 4,650,000 | (7,821,900) | 1,325,306 | (4,650,000) | 7,821,900 | (1,729) | 18.2 | 1.566 | 0.650 |
| AUD-USD | 7,895,000 | (7,544,462) | 724,268 | (7,895,000) | 7,544,462 | (27,412) | 9.6 | 0.9556 | 4.725 |
| USD-MXN | (4,387,529) | 55,418,000 | 346,615 | 4,387,529 | (55,418,000) | (11,572) | 7.9 | 12.6308 | 3.530 |
| USD-HUF | 1,317,774 | (275,000,000) | 168,671 | (1,317,774) | 275,000,000 | 4,640 | 12.8 | 208.69 | 4.590 |
| USD-BRL | 6,069,003 | (10,435,650) | 1,219,870 | (6,069,003) | 10,435,650 | 35,832 | 20.1 | 1.7195 | 7.450 |
| USD-NOK | (2,578,108) | 15,175,258 | 293,904 | 2,578,108 | (15,175,258) | (4,007) | 11.4 | 5.8862 | 2.230 |
| USD-DKK | (3,247,546) | 18,065,450 | 315,012 | 3,247,546 | (18,065,450) | (338) | 9.7 | 5.5628 | 0.490 |
| USD-IDR | (10,884) | 97,517,835 | 1,687 | 10,884 | (97,517,835) | (14) | 15.5 | 8960 | 1.875 |
| NZD-USD | (5,034,426) | 3,714,903 | 427,926 | 5,034,426 | (3,714,903) | (12,376) | 8.5 | 0.7379 | 3.315 |

FIG. 2A

| CURR PAIR 280 | EXPOSURE 250 | | | HEDGE 260 | | | CUMULATIVE 270 | | |
|---|---|---|---|---|---|---|---|---|---|
| | CURR1 252 | CURR2 254 | VAR 256 | CURR1 262 | CURR2 264 | COST 266 | COST 272 | VAR 274 | V/C 276 |
| | | | | | | | 0 | 8,625,302 | |
| USD-HKD | (900,785) | 7,000,000 | 2,702 | 900,785 | (7,000,000) | 274 | 274 | 8,622,600 | 9.863014 |
| USD-PHP | 2,783,964 | (125,000,000) | 136,414 | (2,783,964) | 125,000,000 | 7,552 | 7,825 | 8,486,186 | 18.06452 |
| USD-CNY | (2,203,128) | 15,000,000 | 22,031 | 2,203,128 | (15,000,000) | 1,129 | 8,955 | 8,464,154 | 19.5122 |
| USD-BRL | 3,356,381 | (5,825,00) | 674,633 | (3,356,381) | 5,825,00 | 20,096 | 29,051 | 7,789,522 | 33.56994 |
| USD-HUF | 1,240,135 | (275,000,000) | 158,737 | (1,240,135) | 275,000,000 | 4,335 | 33,386 | 7,630,784 | 36.61502 |
| USD-RUB | 2,442,201 | (75,000,000) | 288,180 | (2,442,201) | 75,000,000 | 4,081 | 37,467 | 7,342,605 | 70.62344 |
| USD-SEK | 10,789,039 | (78,350,000) | 1,100,482 | (10,789,039) | 78,350,000 | 4,271 | 41,737 | 6,242,123 | 257.6842 |
| USD-SGD | (4,826,255) | 6,500,000 | 73,745 | 4,826,255 | (6,500,000) | 463 | 42,200 | 6,068,377 | 375.6522 |
| EUR-USD | 9,375,000 | 12,018,750 | 1,598,494 | (9,375,000) | (12,018,750) | (801) | 41,399 | 4,469,884 | -1995 |
| USD-THB | (12,800,000) | 400,000,000 | 1,766,400 | 12,800,000 | (400,000,000) | (1,440) | 39,959 | 2,703,484 | -1226.67 |
| GBP-USD | 4,650,000 | 7,158,675 | 1,302,879 | (4,650,000) | (7,158,675) | (2,148) | 37,811 | 1,400,605 | -606.667 |
| USD-CAD | (4,751,497) | 5,000,000 | 375,368 | 4,751,497 | (5,000,000) | (3,286) | 34,525 | 1,025,237 | -114.217 |
| AUD-USD | 7,895,000 | 7,186,029 | 689,859 | (7,895,000) | (7,186,029) | (26,259) | 8,266 | 335,378 | -26.2714 |
| USD-MXN | (4,245,289) | 55,418,000 | 335,378 | 4,245,289 | (55,418,000) | (13,284) | (5,019) | 0 | -25.2463 |
| | | | 8,625,302 | | | | | | |

FIG. 2B

| CURR PAIR 310 | EXPOSURE 320 | | | HEDGE 330 | | | VAR TO C 340 |
|---|---|---|---|---|---|---|---|
| | CURR1 322 | CURR2 324 | VAR 326 | CURR1 332 | CURR2 334 | COST 336 | |
| USD-THB | (13,084,724) | 400,000,000 | 1,805,692 | 13,084,724 | (400,000,000) | (6,869) | (262.86) |
| USD-CAD | (4,853,898) | 5,000,000 | 383,458 | 4,853,898 | (5,000,000) | (3,297) | (116.32) |
| USD-RUB | (3,140,073) | 97,354,825 | 370,529 | 3,140,073 | (97,354,825) | (6,215) | (59.62) |
| EUR-USD | 9,375,000 | (12,470,625) | 1,658,593 | (9,375,000) | 12,470,625 | (3,014) | (550.34) |
| GBP-USD | 4,650,000 | (7,821,900) | 1,325,306 | (4,650,000) | 7,821,900 | (1,729) | (766.32) |
| AUD-USD | 7,895,000 | (7,544,462) | 724,268 | (7,895,000) | 7,544,462 | (27,412) | (26.42) |
| USD-MXN | (4,387,529) | 55,418,000 | 346,615 | 4,387,529 | (55,418,000) | (11,572) | (29.95) |
| USD-NOK | (2,578,108) | 15,175,258 | 293,904 | 2,578,108 | (15,175,258) | (4,007) | (73.35) |
| USD-DKK | (3,247,546) | 18,065,450 | 315,012 | 3,247,546 | (18,065,450) | (338) | (931.20) |
| USD-IDR | (10,884) | 97,517,835 | 1,687 | 10,884 | (97,517,835) | (14) | (123.18) |
| NZD-USD | (5,034,426) | 3,714,903 | 427,926 | 5,034,426 | (3,714,903) | (12,376) | (34.58) |

FIG. 3A

| CURR PAIR 358 | EXPOSURE 350 | | | HEDGE 360 | | | VAR TO C 370 | CUMULATIVE 380 | |
| --- | --- | --- | --- | --- | --- | --- | --- | --- | --- |
| | CURR1 352 | CURR2 354 | VAR 356 | CURR1 362 | CURR2 364 | COST 366 | | COST 382 | VAR 384 |
| | | | | | | | | 0 | 7,652,990 |
| USD-DKK | (3,247,546) | 18,065,450 | 315,012 | 3,247,546 | (18,065,450) | (338) | (931.20) | (338) | 7,337,978 |
| GBP-USD | 4,650,000 | (7,821,900) | 1,325,306 | (4,650,000) | 7,821,900 | (1,729) | (766.32) | (2,068) | 6,012,672 |
| EUR-USD | 9,375,000 | (12,470,625) | 1,658,593 | (9,375,000) | 12,470,625 | (3,014) | (550.34) | (5,081) | 4,354,079 |
| USD-THB | (13,084,724) | 400,000,000 | 1,805,692 | 13,084,724 | (400,000,000) | (6,869) | (262.86) | (11,951) | 2,548,387 |
| USD-IDR | (10,884) | 97,517,835 | 1,687 | 10,884 | (97,517,835) | (14) | (123.18) | (11,965) | 2,546,700 |
| USD-CAD | (4,853,898) | 5,000,000 | 383,458 | 4,853,898 | (5,000,000) | (3,297) | (116.32) | (15,261) | 2,163,242 |
| USD-NOK | (2,578,108) | 15,175,258 | 293,904 | 2,578,108 | (15,175,258) | (4,007) | (73.35) | (19,268) | 1,869,338 |
| USD-RUB | (3,140,073) | 97,354,825 | 370,529 | 3,140,073 | (97,354,825) | (6,215) | (59.62) | (25,483) | 1,498,809 |
| NZD-USD | (5,034,426) | 3,714,903 | 427,926 | 5,034,426 | (3,714,903) | (12,376) | (34.58) | (37,859) | 1,070,883 |
| USD-MXN | (4,387,529) | 55,418,000 | 346,615 | 4,387,529 | (55,418,000) | (11,572) | (29.95) | (49,431) | 724,268 |
| AUD-USD | 7,895,000 | (7,544,462) | 724,268 | (7,895,000) | 7,544,462 | (27,412) | (26.42) | (76,843) | 0 |
| | | | 7,652,990 | | | (26.42) | | | |

FIG. 3B

| CURR PAIR 410 | EXPOSURE 420 | | | HEDGE 430 | | | VAR TO C 440 |
|---|---|---|---|---|---|---|---|
| | CURR1 422 | CURR2 424 | VAR 426 | CURR1 432 | CURR2 434 | COST 436 | |
| USD-CNY | (2,237,303) | 15,000,000 | 22,373 | 2,237,303 | (15,000,000) | 8,735 | |
| USD-THB | (13,084,724) | 400,000,000 | 1,805,692 | 13,084,724 | (400,000,000) | (6,869) | (262.86) |
| USD-CAD | (4,853,898) | 5,000,000 | 383,458 | 4,853,898 | (5,000,000) | (3,297) | (116.32) |
| USD-SEK | 11,436,621 | (78,350,000) | 1,166,535 | (11,436,621) | 78,350,000 | 4,622 | |
| USD-RUB | (3,140,073) | 97,354,825 | 370,529 | 3,140,073 | (97,354,825) | (6,215) | (59.62) |
| USD-SGD | (4,904,550) | 6,500,000 | 176,564 | 4,904,550 | (6,500,000) | 61 | |
| USD-PHP | 5,161,185 | (225,853,462) | 252,898 | (5,161,185) | 225,853,462 | 10,021 | |
| USD-HKD | (902,353) | 7,000,000 | 2,707 | 902,353 | (7,000,000) | 199 | |
| EUR-USD | 9,375,000 | (12,470,625) | 1,658,593 | (9,375,000) | 12,470,625 | (3,014) | (550.34) |
| GBP-USD | 4,650,000 | (7,821,900) | 1,325,306 | (4,650,000) | 7,821,900 | (1,729) | (766.32) |
| AUD-USD | 7,895,000 | (7,544,462) | 724,268 | (7,895,000) | 7,544,462 | (27,412) | (26.42) |
| USD-MXN | (4,387,529) | 55,418,000 | 346,615 | 4,387,529 | (55,418,000) | (11,572) | (29.95) |
| USD-HUF | 1,317,774 | (275,000,000) | 168,671 | (1,317,774) | 275,000,000 | 4,640 | |
| USD-BRL | 6,069,003 | (10,435,650) | 1,219,870 | (6,069,003) | 10,435,650 | 35,832 | (73.35) |
| USD-NOK | (2,578,108) | 15,175,258 | 293,904 | 2,578,108 | (15,175,258) | (4,007) | (931.20) |
| USD-DKK | (3,247,546) | 18,065,450 | 315,012 | 3,247,546 | (18,065,450) | (338) | (123.18) |
| USD-IDR | (10,884) | 97,517,835 | 1,687 | 10,884 | (97,517,835) | (14) | |
| NZD-USD | (5,034,426) | 3,714,903 | 427,926 | 5,034,426 | (3,714,903) | (12,376) | (34.58) |

FIG. 4A

| CURR PAIR 458 | EXPOSURE 450 | | | HEDGE 460 | | | VAR TO C 470 | CUMULATIVE 480 | |
|---|---|---|---|---|---|---|---|---|---|
| | CURR1 452 | CURR2 454 | VAR 456 | CURR1 462 | CURR2 464 | COST 466 | | COST 482 | VAR 484 |
| | | | | | | | | 0 | 10,662,608 |
| USD-BRL | 6,069,003 | (10,435,650) | 1,219,870 | (6,069,003) | 10,435,650 | 35,832 | | 35,832 | 9,442,738 |
| USD-PHP | 5,161,185 | (225,853,462) | 252,898 | (5,161,185) | 225,853,462 | 10,021 | | 45,854 | 9,189,840 |
| USD-CNY | (2,237,303) | 15,000,000 | 22,373 | 2,237,303 | (15,000,000) | 8,735 | | 54,589 | 9,167,467 |
| USD-HUF | 1,317,774 | (275,000,000) | 168,671 | (1,317,774) | 275,000,000 | 4,640 | | 59,228 | 8,998,796 |
| USD-SEK | 11,436,621 | (78,350,000) | 1,166,535 | (11,436,621) | 78,350,000 | 4,622 | | 63,850 | 7,832,261 |
| USD-HKD | (902,353) | 7,000,000 | 2,707 | 902,353 | (7,000,000) | 199 | | 64,050 | 7,829,554 |
| USD-SGD | (4,904,550) | 6,500,000 | 176,564 | 4,904,550 | (6,500,000) | 61 | | 64,111 | 7,652,990 |
| USD-DKK | (3,247,546) | 18,065,450 | 315,012 | 3,247,546 | (18,065,450) | (338) | (931.20) | 63,773 | 7,337,978 |
| GBP-USD | 4,650,000 | (7,821,900) | 1,325,306 | (4,650,000) | 7,821,900 | (1,729) | (766.32) | 62,043 | 6,012,672 |
| EUR-USD | 9,375,000 | (12,470,625) | 1,658,593 | (9,375,000) | 12,470,625 | (3,014) | (550.34) | 59,029 | 4,354,079 |
| USD-THB | (13,084,724) | 400,000,000 | 1,805,692 | 13,084,724 | (400,000,000) | (6,869) | (262.86) | 52,160 | 2,548,387 |
| USD-IDR | (10,884) | 97,517,835 | 1,687 | 10,884 | (97,517,835) | (14) | (123.18) | 52,146 | 2,546,700 |
| USD-CAD | (4,853,898) | 5,000,000 | 383,458 | 4,853,898 | (5,000,000) | (3,297) | (116.32) | 48,850 | 2,163,242 |
| USD-NOK | (2,578,108) | 15,175,258 | 293,904 | 2,578,108 | (15,175,258) | (4,007) | (73.35) | 44,843 | 1,869,338 |
| USD-RUB | (3,140,073) | 97,354,825 | 370,529 | 3,140,073 | (97,354,825) | (6,215) | (59.62) | 38,628 | 1,498,809 |
| NZD-USD | (5,034,426) | 3,714,903 | 427,926 | 5,034,426 | (3,714,903) | (12,376) | (34.58) | 26,252 | 1,070,883 |
| USD-MXN | (4,387,529) | 55,418,000 | 346,615 | 4,387,529 | (55,418,000) | (11,572) | (29.95) | 14,680 | 724,268 |
| AUD-USD | 7,895,000 | (7,544,462) | 724,268 | (7,895,000) | 7,544,462 | (27,412) | (26.42) | (12,732) | 0 |
| | | | 10,662,608 | | | (12,732) | | | |

FIG. 4B

| CURR PAIR 558 | EXPOSURE 550 | | | HEDGE 560 | | | VAR TO C 570 | CUMULATIVE 580 | |
|---|---|---|---|---|---|---|---|---|---|
| | CURR1 552 | CURR2 554 | VAR 556 | CURR1 562 | CURR2 564 | COST 566 | | COST 582 | VAR 584 |
| | | | | | | | | 0 | 10,662,608 |
| USD-BRL | 6,069,003 | (10,435,650) | 1,219,870 | (6,069,003) | 10,435,650 | 35,832 | | 35,832 | 9,442,738 |
| USD-SEK | 11,436,621 | (78,350,000) | 1,166,535 | (11,436,621) | 78,350,000 | 4,622 | | 40,455 | 8,276,203 |
| USD-PHP | 5,161,185 | (225,853,462) | 252,898 | (5,161,185) | 225,853,462 | 10,021 | | 50,476 | 8,023,305 |
| USD-SGD | (4,904,550) | 6,500,000 | 176,564 | 4,904,550 | (6,500,000) | 61 | | 50,537 | 7,846,741 |
| USD-HUF | 1,317,774 | (275,000,000) | 168,671 | (1,317,774) | 275,000,000 | 4,640 | | 55,177 | 7,678,070 |
| USD-CNY | (2,237,303) | 15,000,000 | 22,373 | 2,237,303 | (15,000,000) | 8,735 | | 63,912 | 7,655,697 |
| USD-HKD | (902,353) | 7,000,000 | 2,707 | 902,353 | (7,000,000) | 199 | | 64,111 | 7,652,990 |
| USD-DKK | (3,247,546) | 18,065,450 | 315,012 | 3,247,546 | (18,065,450) | (338) | (931.20) | 63,773 | 7,337,978 |
| GBP-USD | 4,650,000 | (7,821,900) | 1,325,306 | (4,650,000) | 7,821,900 | (1,729) | (766.32) | 62,043 | 6,012,672 |
| EUR-USD | 9,375,000 | (12,470,625) | 1,658,593 | (9,375,000) | 12,470,625 | (3,014) | (550.34) | 59,029 | 4,354,079 |
| USD-THB | (13,084,724) | 400,000,000 | 1,805,692 | 13,084,724 | (400,000,000) | (6,869) | (262.86) | 52,160 | 2,548,387 |
| USD-IDR | (10,884) | 97,517,835 | 1,687 | 10,884 | (97,517,835) | (14) | (123.18) | 52,146 | 2,546,700 |
| USD-CAD | (4,853,898) | 5,000,000 | 383,458 | 4,853,898 | (5,000,000) | (3,297) | (116.32) | 48,850 | 2,163,242 |
| USD-NOK | (2,578,108) | 15,175,258 | 293,904 | 2,578,108 | (15,175,258) | (4,007) | (73.35) | 44,843 | 1,869,338 |
| USD-RUB | (3,140,073) | 97,354,825 | 370,529 | 3,140,073 | (97,354,825) | (6,215) | (59.62) | 38,628 | 1,498,809 |
| NZD-USD | (5,034,426) | 3,714,903 | 427,926 | 5,034,426 | (3,714,903) | (12,376) | (34.58) | 26,252 | 1,070,883 |
| USD-MXN | (4,387,529) | 55,418,000 | 346,615 | 4,387,529 | (55,418,000) | (11,572) | (29.95) | 14,680 | 724,268 |
| AUD-USD | 7,895,000 | (7,544,462) | 724,268 | (7,895,000) | 7,544,462 | (27,412) | (26.42) | (12,732) | 0 |
| | | | 10,662,608 | | | (12,732) | | | |

FIG. 5A

RISK-COST ANALYSIS OF CURRENCY EXPOSURE REDUCTION FOR CURRENCY EXPOSURE MANAGEMENT

This U.S. Patent Application claims the benefit of priority of Provisional Application No. 61/247,850, filed Oct. 1, 2009.

FIELD

Embodiments of the invention relate to foreign currency exposure reduction, and more particularly to computation and analysis of foreign currency exposure reduction actions based on value-at-risk (VaR) and cost associated with foreign currency exposure reduction actions.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2010, RimTec Inc., All Rights Reserved.

BACKGROUND

Companies make investment and operation decisions each day as they carry out their business. As companies expand internationally, they will most likely enter into business transactions that are denominated in a foreign currency, or a currency that is different than that of the company. The value of these foreign currency denominated business transactions changes in relationship to the currency of the parent company (or the owning subsidiary) each day they are outstanding, given that the exchange rate between the two currencies (transaction currency and company/subsidiary currency) changes 24 hours per day with the movement of the inter-bank foreign currency market. Thus, a company may realize an economic loss or economic gain based solely on the movement in the foreign currency market between the date of purchase/sale and date of payment/collection or conversion.

The potential loss or gain realized by movement in the foreign currency market results in an uncertainty or a risk that most companies would like to manage to the extent possible. However, the risk or uncertainty increases as a company expands further internationally, and increases the number and amount of foreign currency exposure relationships.

As the amount of the foreign currency exposure increases, companies assess whether they are comfortable with the exposure. If they are not comfortable, they generally begin to implement foreign currency risk management programs aimed at reducing the exposure. Exposure reduction may be accomplished by currency conversion or the use of foreign currency derivative instruments. For example, a company may enter into hedges by purchasing foreign currency forward contracts or foreign currency option contracts. A hedge reduces the risk of economic loss associated with a foreign currency exposure.

However, many exposure reduction actions may have an associated cost to perform the action (e.g., a net cost to enter a hedge contract). Additionally, the risk of a currency exposure is not necessarily equal across currencies; rather, risk associated with currency exposure can vary significantly based on volatility in the foreign currency inter-bank market associated with the currencies of the exposure. For example, the risk inherent in EUR-USD may be 12.3% while the risk inherent in USD-HKD) may be less than 0.5% (because HKD) is tied to or pegged to USD). The inherent risk is represented by a volatility factor that indicates how likely it is that a change in the exchange rate between the currencies will happen. Thus, the volatility associated with a currency exposure may be represented with a value-at-risk (VaR) methodology or other methodologies known in the art.

A company may not be able to perform all actions necessary to reduce foreign currency exposure, and performing all actions may not be necessary to bring foreign currency exposure within a tolerable risk for the company. However, it is difficult to determine what actions are "better" to perform than other actions, or which actions may be worth the cost of performing. Presently there are no tools to allow evaluation of foreign currency exposure reduction actions, especially to evaluate how each potential reduction action may compare to other possible actions, in a way that would allow a user to determine what actions would be preferred, or choosing to perform one action over another.

BRIEF DESCRIPTION OF THE DRAWINGS

The following description includes discussion of FIGS. having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 2A is an embodiment of an example of foreign currency exposure and hypothetical exposure reduction action data, including analytics data.

FIG. 2B is an embodiment of an example of foreign currency exposure and hypothetical exposure reduction action data, including cumulative cost and VaR in the analytics data.

FIG. 3A is an embodiment of an example of foreign currency exposure and hypothetical exposure reduction action data, including analytics data, where the data is unordered and all hypothetical exposure reduction actions have an associated net negative cost.

FIG. 3B is an embodiment of an example of foreign currency exposure and hypothetical exposure reduction action data, including analytics data, where the data is ordered by a ratio of VaR to C and all hypothetical exposure reduction actions have an associated net negative cost.

FIG. 4A is an embodiment of an example of foreign currency exposure and hypothetical exposure reduction action data, including analytics data, where the data is unordered and hypothetical exposure reduction actions have associated net negative or net positive costs.

FIG. 4B is an embodiment of an example of foreign currency exposure and hypothetical exposure reduction action data, including analytics data, where the data is ordered and hypothetical exposure reduction actions have associated net negative or net positive costs.

FIG. 5A is an embodiment of an example of foreign currency exposure and hypothetical exposure reduction action data, including analytics data, where the data is ordered hypothetical exposure reduction actions have associated net negative or net positive costs.

Figure 1:
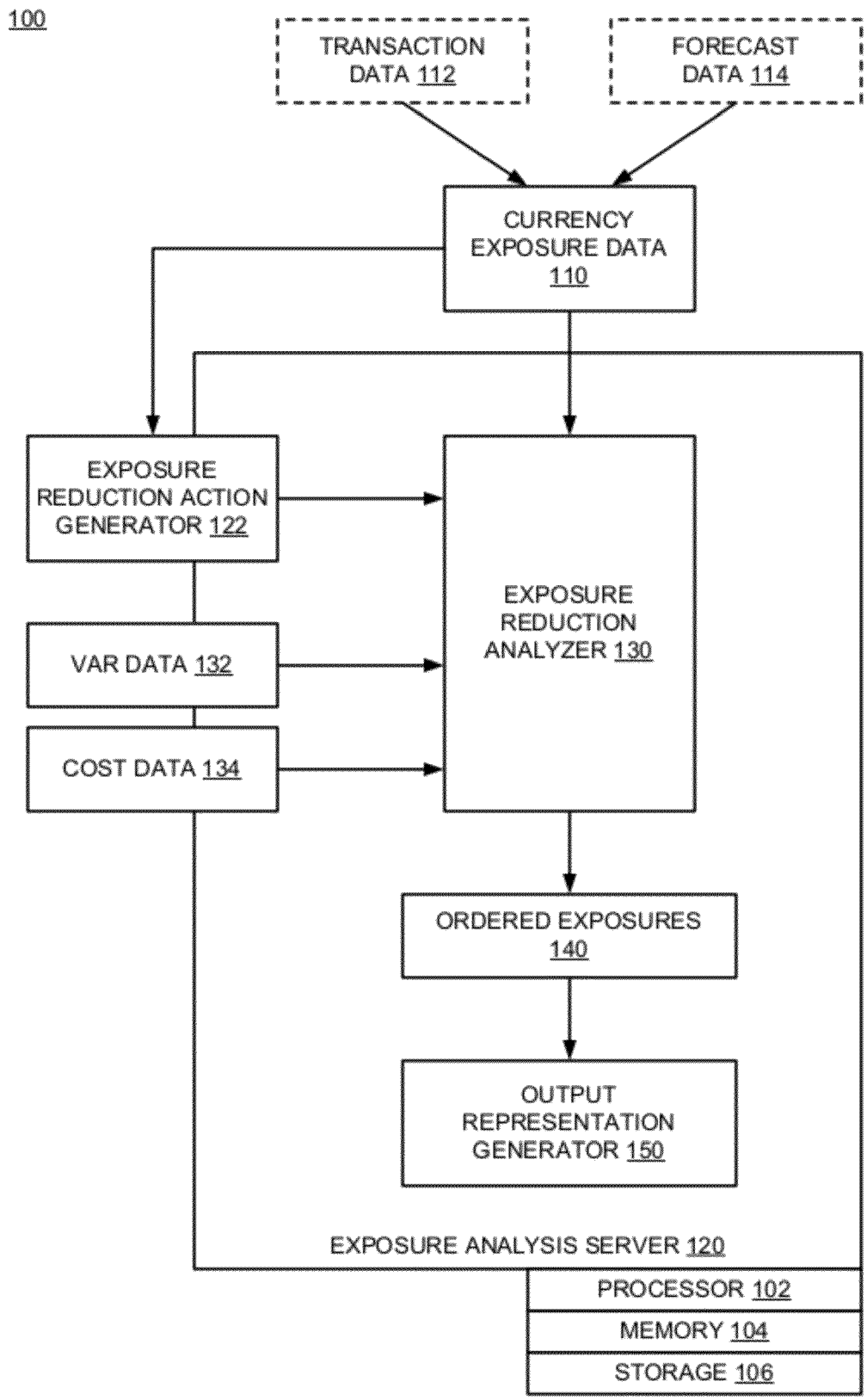
FIG. 1 is a block diagram of an embodiment of a system with currency exposure reduction analysis engine.

Descriptions of certain details and implementations follow, including a description of the FIGS., which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, foreign currency exposure reduction analysis is provided. Value-at-risk (VaR) for currency exposures and cost of potential exposure reduction actions are used to order currency exposure representing foreign currency exposure for a company. Currency exposures associated with negative cost actions are ordered based on a ratio of VaR to cost. Currency exposure associated with positive cost actions can also be ordered, either based on VaR or cost. An output representation including accumulated VaR and cost is provided based on the ordering and on computed VaR and cost values. In one embodiment, a graphical representation of cumulative remaining VaR versus accumulated cost is generated from plot points based on the ordered currency exposures. The output representation allows comparing potential exposure reduction actions.

As used herein, foreign currency exposure, currency exposure, or simply exposure, refers to a relationship between a transaction currency and a reference currency. The transaction currency is a currency in which actual transactions that have occurred are designated, or a currency designation for transactions forecasted to occur. The reference currency could be a reporting currency, functional currency, or other designated or company-defined reference currency.

An exposure reducing action or an exposure reduction action refers to an action taken to reduce the exposure defined above. An exposure reducing action may be a hedge. A derivative instrument refers to the form of an exposure reducing action or hedge. Examples of derivative instruments include foreign currency forward contracts, option contracts, and other instruments available from the currency or financial market or markets. As used generally herein, each exposure reducing action or hedge will reduce the VaR associated with an exposure to "0". Thus, VaR reduction refers to the implementing of an exposure reduction action. Each derivative instrument, depending on the type selected, has an associated cost, which can include interest differential, premiums, or other market generated costs.

As suggested above, the risk of foreign currency exposure increases as a company increases its international expansion (e.g., doing business in a country with a currency different than the currency of its country of origin). As an example, assume a US company sells its product to a European customer, denominating the sale in euros (EUR) and giving the customer 60 day payment terms. For purposes of this example, consider the invoice to be EUR 1 million. If at the time of the sale, the EUR-USD exchange rate was 1.4500, the USD value of the account receivable was USD 1,450,000.

However, as the EUR-USD exchange rate changes daily, the USD value of the account receivable changes until such time as the EUR is collected and exchanged into USD. Assume that the EUR 1 million was collected 60 days later, the EUR converted to USD upon receipt and the exchange rate for the conversion was 1.3500 based upon the inter-bank market rate at the time of the conversion. The company would realize an economic loss of USD 100,000 given the movement in the foreign currency market between the date of sale and date of collection/conversion.

Currently, companies make the decision to hedge (e.g., purchase a derivative instrument) based upon an amount of the foreign currency exposure (e.g., EUR 1 million in the example above). The larger values of exposure tend to receive more attention. Thus, extending the above example to have a USD amount of exposure of USD 1.75 million versus the USD 1.45 million of the above example, currently companies tend to address the exposure of USD 1.75 million first. However, analysis of each exposure reveals other properties related to both the exposure and a hypothetical hedge of the exposure that can be utilized to provide a framework for making exposure reduction or hedging decisions.

A first property includes the risk of loss associated with each foreign currency exposure. The risk of loss associated with each foreign currency is different given the volatility in the foreign currency inter-bank market associated with the currencies of the exposure. For example, the risk inherent in EUR-USD may be 12.3% while the risk inherent in USD-HKD may be less than 0.5%. The typical approach to measuring this risk includes techniques like value-at-risk and other methodologies known in the art.

A second property includes the cost to hedge exposures with derivative instruments such as foreign currency forward contracts, option contracts, or other instruments. The cost differs for each of the currency relationships. For example, a component of the price of a forward currency forward contract or of an options contract is the forward points or interest differential. The interest differential is a calculated pricing adjustment based upon a comparison of the interest rates of the countries of the currency relationship over the duration of the forward contract (e.g., a yield curve comparison for the two currencies), and an understanding of the currencies that will be purchased and sold with the forward contract. For example, hedging an AUD-USD exposure may generate 1% in interest income over the duration, while hedging a USD-BRL exposure may cost 1.75% over the duration.

Thus, closer evaluation of the costs associated with hypothetical exposure reduction actions, such as a foreign currency forward contract, reveals that some actions may result in a net income while at the same time reducing foreign currency exposure.

Accordingly, as provided herein, hedging decisions for multiple foreign currency exposures can be informed through the use of information not currently used for decision analysis.

The analysis includes generating hypothetical hedging decisions, and using one or more factors including value-atrisk (VaR), foreign currency interest differential (and potentially overhead cost of an instrument), collectively referred to as exposure reduction cost, and/or a calculated risk-cost factor in making decisions. Currency exposures are ordered based on one or more of the factors, and the information presented in a way to allow comparison of one action to another. One or more actions can then be taken to reduce the overall portfolio risk associated with the foreign currency exposures to a level that is acceptable given foreign currency risk policy constraints or the company's risk tolerance levels.

The analysis results in the generation of an output representation, which may take the form of a structured list, a table, a graph, or some other representation. A structured list includes similar fields with ordered currency exposures to indicate similar information (such as VaR-based and cost-based information) to compare one potential action to another. A table is similar to a structured list, with rows and columns as the structured fields. Additional computed information can be appended or inserted into a representation of the currency exposure. Thus, computed values can be generated and associated with a currency exposure.

In one embodiment, the analysis can result in the generation of plot points representing cumulative risk reduction and cumulative cost (the accumulation of interest income and negative cost) associated with each exposure reduction decision. For a graph, the plot points are plotted on a chart or graph where one axis (e.g., the y-axis) represents remaining VaR after the exposure reduction action and the other axis (e.g., the x-axis) represents accumulated income or cost. The axes could be reversed. Connecting each of the points creates a graphical representation of the cost-risk relationships associated with specific potential actions. As the population of hedge decisions increases, the graphical representation takes the form of a curve.

FIG. 1 is a block diagram of an embodiment of a system with a currency exposure reduction analysis engine. System 100 represents a system for providing foreign currency exposure analysis. The analysis engine could refer to the entirety of components that calculate the various aspects of the currency exposure reduction analysis, or it could refer to the elements of the exposure analysis server that perform the calculations. System 100 includes exposure analysis server 120, which represents various components of hardware and/or software to provide a currency exposure reduction analysis according to any embodiment described herein.

Exposure analysis server 120 receives or accesses currency exposure data 110. Currency exposure data 110 can include transaction data 112 or forecast data 114. Transaction data 112 includes data related to transactions already performed. Transaction data 112 refers to data from a general ledger or ERP (enterprise resource planning) system data or other business system data. Forecast data 114 refers to data related to prospective transactions, or transactions or currency exposure data predicted to occur. Such forecast data may be used, for example, to make estimates for a company for accounting purposes.

Exposure analysis server 120 includes exposure reduction analyzer 130. Analyzer 130 receives or accesses currency exposure data 110 for analysis. Currency exposure data 110 is also provided to exposure reduction action generator 122. Generator 122 generates hypothetical exposure reduction actions for use in exposure reduction analysis. Each hypothetical exposure reduction action is an action that eliminates (i.e., reduces to zero) a particular currency exposure.

Generating the hypothetical exposure reduction action can include generating a hypothetical hedge for an identified currency exposure. Generating the hypothetical exposure reduction action can include generating one or more hypothetical forward contracts, option contracts, or other derivative instruments for an identified currency exposure. The hedge or derivative instruments can be generated from stored information or from information obtained over a network. Thus, for example, the hypothetical exposure reduction action can be created from information that defines how to calculate or create a derivative instrument for a particular provider, or could be a quote (e.g., a real time quote) from a provider.

Different methods can be used for different currency exposures. For example, an offer may be known in the system for a particular currency exposure, which could be used to generate a hypothetical action for that currency exposure, while the hypothetical action can be calculated and/or obtained for another currency exposure (as represented by another currency exposure pair). The analysis of what actions to take to reduce currency exposure is thus based on real and/or simulated actions. Although "real" actions may be used in the sense that such real actions may be essentially immediately available, it will be understood that all currency exposure reduction actions are referred to as "hypothetical" for purposes of analysis, because for purposes of analysis it is assumed that an action is being evaluated to determine whether it should be executed. Until the action is acted upon, it is hypothetical for purposes herein.

Each currency exposure has an associated VaR. (value-at-risk) associated with the volatility of the exchange rate between the two currencies of the exposure. Each hypothetical currency exposure reduction action has an associated cost (C). The cost can be positive (i.e., a net positive income for the company) or negative (a net negative cost) to eliminate the exposure with the hypothetical action. VaR data 132 and cost data 134 are received into exposure reduction analyzer 130 to enable analysis. As suggested above, the source of VaR data 132 and/or cost data 134 may be local to server 120, or external (separate from) server 120. Similarly, exposure reduction action generator 122 may be part of server 120, or may be separate from server 120. Thus, none of these is shown completely within the box representing server 120.

To reiterate, VaR can be obtained by accessing a stored VaR value for one or more of the identified currency exposures, or the VaR can be computed. Computing the VaR may include, for each currency exposure for which VaR is being calculated, summing all data having a common currency pair indicator, and multiplying the sum by an associated risk factor (volatility factor) for the currency pair. Cost can be obtained by accessing a quoted cost value, and/or computing the cost.

Exposure reduction analyzer 130 performs calculations related to the analysis of the hypothetical currency exposure actions. In particular, exposure reduction analyzer 130 performs a sorting of the currency exposures. Multiple different techniques can be applied to currency exposure data 110 to sort it. In one embodiment, the hypothetical exposure reduction actions are identified for each currency exposure as having a net positive cost or having a net negative cost, and sorted based in part on whether they are positive or negative. In one embodiment, currency exposures with net negative cost are sorted differently than those with net positive costs.

Assume the total number of currency exposures is represented by N+M, where a number N of currency exposures have an associated hypothetical exposure reduction action with a net negative cost, and a number M of currency exposures have an associated hypothetical exposure reduction action with a net positive cost. The N negative-cost currency exposures are sorted based on a factor or a ratio described in more detail below. The M positive-cost currency exposures are sorted based on either VaR or cost (C). In some scenarios, M may be zero, which would result in all currency exposures being soiled based on the factor or ratio.

For the number N of currency exposures, exposure reduction analyzer 130 computes an associated ratio of VaR to C for each currency exposure. In one embodiment, the currency exposures are ordered by exposure reduction analyzer 130 in order of highest absolute value ratio to lowest, or largest negative to smallest negative value. Such an ordering indicates the largest currency exposure reduction per unit cost. Thus, assuming two ratios, one being −2.0, and another being −1.5, the currency exposure associated with the ratio −2.0 would be ordered higher than the currency exposure associated with the ratio −1.5. The ratio −2.0 indicates that for every dollar spent (C), currency exposure is reduced by two dollars (VaR) (versus one and one half dollars reduction per dollar spent for the −1.5 ratio). Thus, the ratio of VaR to C indicates a "most efficient reduction rate." Accordingly, negative-cost currency exposures can be ordered 1 through N based on their associated ratios from largest negative to smallest negative.

For the negative-cost currency exposures, the ratio can be represented as:

$$\frac{VaR}{C}, \quad (1)$$

where each associated ratio indicates risk reduction per cost for the exposure reduction action.

For the number M currency exposures having an associated hypothetical exposure reduction action with a net positive cost (positive-cost currency exposures), the currency exposures may be ordered based on C (from highest to lowest net positive cost, or most income to least income) or based on VaR (from highest to lowest VaR, or most net exposure reduction to lowest).

It will be understood that ordering the positive-cost currency exposures by the ratio of VaR to C may or may not make sense. In the case that the VaR to C ratio is computed for the positive-cost exposure reduction actions, the ratio may indicate a net currency exposure reduction per dollar of income. Smaller ratios indicate less exposure reduction per dollar of income than higher ratios. However, while computing and reviewing the ratio may or may not provide an academic interest, from one perspective it has little to no practical value. The ratio of positive-cost currency exposures may have no practical value because a company would be benefited from performing all actions associated with all positive-cost currency exposures, and so determining which actions result in higher "efficiency" may be solely academic.

Thus, it is expected that while a VaR to C ratio could be computed for currency exposures identified as having a net positive C, there may not be any real practical reason to do so. Rather, either all actions associated with all positive-cost currency exposures will be performed, or the actions can be ordered based on highest income generating actions (in order of C), or based on most exposure reduction (in order of VaR), and selected on a policy preference of the company without needing to look at "efficiency."

Exposure reduction analyzer 130 thus generates ordered exposures 140. A representation of the ordering of the currency exposures is generated from the computed ordering. In one embodiment, output representation generator 150 is part of exposure reduction analyzer 130, and is used to generate an output representation. For example, a table or list could be generated by output representation generator 150 to indicate the determined or computed ordering of currency exposures.

In one embodiment, output representation generator 150 generates a graphical representation of the ordered exposures.

In one embodiment, information is generated for each currency exposure related to cumulative remaining VaR and cumulative cost based on an assumption that all previous exposure reduction actions in the ordered list have been taken. Thus, the first of the ordered currency exposures can include generated information to indicate what total VaR would be remaining after performing the hypothetical exposure reduction action associated with the first ordered currency exposure. Additionally, the first ordered currency exposure can include generated information to indicate a total cumulative cost would result after performing the hypothetical exposure reduction action associated with the first ordered currency exposure. The second ordered currency exposure would include cumulative remaining VaR and cumulative cost as adjusted from the values of the first ordered currency exposure by the hypothetical exposure reduction action associated with the second currency exposure. Such information can be generated and included with each currency exposure down the list to the last, when the VaR would be zero, and the cost would be the total cost associated with performing all hypothetical actions.

Mathematically, it can be said that for each currency exposure down the list, values for VaR and cost would be calculated as set forth in equations (2) and (3), respectively:

$$\sum_{n=1}^{N} VaR_n; \quad (2)$$

$$\sum_{n=1}^{N} C_n. \quad (3)$$

where N is the number of currency exposures being evaluated, and each nth currency exposure represents the next ordered currency exposure in the list.

While the representation of equation (3) indicates a cumulative cost, the cumulative remaining VaR may be generated in reference to a starting total VaR. It will be understood that "doing nothing," or performing none of the exposure reduction actions results in a net zero cost. Thus, the sum of all costs is the cumulative cost. For VaR, there is a starting VaR, which can be reduced. A representation of cumulative VaR may then be presented as a total remaining VaR, indicated by:

$$\left( VaR_{Total} - \sum_{n=1}^{N} VaR_n \right), \quad (4)$$

where $VaR_{Total}$ indicates the starting VaR.

It will be understood that another VaR-based value could be used and represented in the output. For example, the total VaR reduction represented by equation (2) may be indicated. In one embodiment, the cumulative values generated are to be used for a graphical representation, which can plot remaining VaR against cumulative cost. Such a graphical representation may be generated from plotting ordered pairs of the form:

$$\left( \left( VaR_{Total} - \sum_{n=1}^{N} VaR_n \right), \sum_{n=1}^{N} C_n \right). \quad (5)$$

It will be understood that the order may be reversed and plotted on opposite axes. A starting plot point for the graph would be some starting point (which would be the initial point of total VaR and starting C). In an embodiment where positive-cost currency exposures exist, the starting point for plotting the negative-cost currency exposures could be the last point of the positive-cost currency exposures, or the last of selected positive-cost currency exposures (assuming that some are left out for some reason). Subsequent plot points are generated per equation (5), and plotted. In words, each nth plot point is an ordered pair of the remaining VaR and cumulative cost. The remaining VaR is calculated by summing the total starting VaR and the VaR reduction of the nth currency exposure and the VaR reduction of all preceding currency exposures. Similarly, the cumulative cost is calculated by summing the starting C and the C of the nth currency exposure and the Cs of all preceding currency exposures. Those plot points can then be used to create a graphical representation of remaining value-at-risk versus accumulated cost to graphically compare potential exposure reduction actions.

When adding positive-cost currency exposures to the analysis, the above description is modified to include N negative-cost currency exposures and M positive-cost currency exposures. The M positive-cost currency exposures may be ordered based on C (e.g., from highest positive return to lowest positive return) or VaR (e.g., from highest VaR reduction to lowest VaR reduction).

Thus, as described above, exposure reduction analyzer 130 can calculate VaR using common VaR calculation techniques, calculate hypothetical interest generated or interest cost associated with a foreign currency forward contract or other instrument used to hedge a foreign currency exposure (e.g., the "cost"), and calculate a "Risk-Cost" factor by dividing the VaR by the hypothetical interest generated or interest cost. The currency exposures are ordered based on one or more of these parameters. Ordering based on VaR compares hedge decisions based on producing the maximum reduction in VaR. Ordering based on cost indicates which hedge decisions produce the most interest income and which cost the most interest expense. Ordering based on the Risk-Cost factor generates an ordering based on efficiency of VaR reduction per cost per hedge decision. The parameters may be used in combination, ordering in different ways, and providing output representations based on the different parameters to serve as a comparison and selection guide.

Exposure analysis server 120 includes various hardware resources, namely, processor 102, memory 104, and storage 106. Processor 102 represents one or more processors, which may be discrete devices, multi-core processors, central processing units (CPUs), microprocessors, microcontrollers, etc. Processor 102 enables exposure analysis server 120 to perform processing and/or analysis. Storage 106 provides non-volatile storage of data and instructions. Memory 104 represents any type of memory that provides temporary storage of data and instructions. Memory 104 may include any type of random access memory (RAM), as well as read-only memory (ROM), or Flash. Thus, memory 104 may be a volatile or non-volatile memory device (i.e., it may or may not lose state when power is interrupted to the memory device). In certain computing devices, memory 104 and storage 106 may be the same device, or partitions of the same device.

In one embodiment, processor 102, memory 104, and storage 106 are resources associated with a hosted server. In one embodiment, currency exposure data is received over a network at exposure analysis server 120, which provides the data analysis services described. Such a server can include a hosted ASP (application service provider) environment, such as an application environment hosted via services over a network (such as the Internet). Exposure analysis server 120 could thus be executed in a hosted ASP server and receive input data from a company or organization to perform analysis. Alternatively, exposure analysis server 120 could be executed locally to the organization or company for which currency exposure data 110 is provided.

In one embodiment, transaction data 112 includes transaction data from the company "books," referring to the general ledger data. Such transaction data includes various records, each representing a business transaction. The transaction data may include a value of each transaction denominated in a currency associated with the transaction. This currency may be different from a reference currency that the company uses for account purposes or for risk management purposes (i.e., the "reporting" currency, or the currency in which the company normally reports its financial data; the "functional" currency, or the currency of one of the company's subsidiaries). Thus each transaction has an associated structured electronic currency exposure representation for the currency pair of the transaction currency and the reference currency.

The structured currency exposure representation includes a currency pair indicator, an obtained value, and a derived value, and has an associated exchange relationship between the two currencies of the currency pair indicator.

The currency pair indicator identifies a currency exposure between a first currency (the transaction currency, or the currency in which the transaction is denominated), and a second currency (the reference currency). Significantly, unlike simply searching rows of data for columns or fields having the currencies, the structured currency exposure representation is created as a manipulable entity within the system. The currency exposure representation is agnostic to order of the currencies. Thus, the currency exposure representation is the same for all transactions having the same two currencies, where the transaction currency is one of the first or second currencies, and the reference currency is the other of the two.

Thus, all common exposure can be considered together by establishing the currency exposure representation that structures the currency exposure relationship. As such, each currency pair indicator is unique to a particular currency exposure type, whether in the first currency with respect to the second currency, or in the second currency with respect to the first currency (e.g., one currency is the transaction currency, and the other is the reference currency). In one embodiment, the currency exposure representations are identified by an ordered pair. The first and second currencies related by an exchange rate, which allows one value to be derived from the other.

The obtained value is a value in the currency exposure representation that is obtained from the value of the transaction denominated in the transaction data. The derived value is not in the transaction data; rather, the value of the derived value is obtained by calculating a numeric equivalent of the obtained value in the second currency based on the exchange rate. Thus, the currency exposure representation is an entity within the system that is created from obtaining certain data from the transaction data, deriving other data based on a relationship between the fields (i.e., the exchange rate), and is then a structured entity that can be used to perform exposure calculations.

The number of currency exposures within the transaction data is identifiable as the number of unique currency exposure pairs or currency exposure pair indicators.

FIG. 2A is an embodiment of an example of foreign currency exposure and hypothetical exposure reduction action data, including analytics data. Currency pair (curr pair) 210 indicates unique currency pairs identified from obtained or received currency exposure data. Exposure 220 illustrates information related to the currency exposure. Hedge 230 illustrates a hypothetical exposure reduction action to offset the exposure.

In the illustrated data, it will be understood that each currency exposure may include multiple transactions. Each individual transaction can be represented by a structured representation as described above, with obtained data and derived data. The sum of all structured transaction representations having a common currency pair (e.g., shown in currency pair 210) is the currency exposure identified by currency pair 210, and whose total values are shown in exposure data 220.

Exposure data 220 includes a first currency (CURR1) 222 and a second currency (CURR2) 224. It will be understood that USD is the reference currency in the examples, and is common throughout all currency pairs 210. First currency 222 and second currency 224 are related by a currency exchange rate, shown in FX/RT (exchange rate) 244. Exposure data 220 also includes VaR 226, which is the absolute value of the value-at-risk in the reference currency (USD). VaR 226 is obtained by taking the absolute value of the multiplication of the reference currency times the volatility factor (V/F) 242. Thus, the VaR for USD-CNY is |(2,237,303) *0.01|= 22,373. It will be observed that the reference currency is first currency 222 for USD-CNY, but is second currency 224 for EUR-USD. Thus, for EUR-USD, the VaR is |(12,470,625)*0.133|=1,658,593. Volatility factor 242 is typically obtained from a market source that makes such information available.

Hedge data 230 illustrates the inverse of the values of exposure data 220, given that the hypothetical reduction action is to eliminate the exposure. Thus, first currency (CURR1) 232 is the same absolute value of first currency 222, but a different sign. The same is true of second currency (CURR2) 234 with respect to second currency 224. Cost 236 is illustrated as an interest rate differential computed by interest rate differential factor 246. Cost 236 is calculated based on the absolute value of the reference currency. The cost as illustrated is computed based on a base factor of 0.365%, and is obtained by calculating the value of the reference currency times the base factor, minus the value of the reference currency times the interest rate, all divided by 12. Mathematically, cost 236 as illustrated can be calculated by:

$$\frac{(Curr_{Ref} * 0.00365) - (Curr_{Ref} * IntRate)}{12}. \qquad (6)$$

where $Curr_{Ref}$ is the reference currency (either first currency 232 or second currency 234), and IntRate is the interest rate (from column 246) for the currency pair.

The illustrated cost is meant only as an example to show that a cost is associated with performing an exposure reduction action, but the specific form or method to determine the cost should not be understood as representative or limiting. Additionally, the represented volatility factors 242, exchange rates 244, and interest rates (and associated cost calculations) are assumed constant for purposes of simplicity throughout all of FIGS. 2A through 5B. Again, the purpose of holding these values constant is for purposes of simplicity in illustration and description, and is in no way representative or limiting.

FIG. 2B is an embodiment of an example of foreign currency exposure and hypothetical exposure reduction action data, including cumulative cost and VaR in the analytics data. In one embodiment, a VaR to Cost ratio or factor (V/C 276— the far right column of the drawing) is computed for each currency pair, and currency pairs ordered 280 based on the computed ratio. It will be observed that certain currency pairs 280 have an associated positive cost 266, while others have an associated negative cost. For purposes of description, they will be referred to, respectively, as positive-cost currency pairs or currency exposures, and negative-cost currency pairs or currency exposures.

As illustrated, one implementation of an ordering algorithm orders the currency exposures by "growing" ratio 276 (i.e., moving from left to right on a hypothetical number line), and treats positive-cost exposures separately from negative-cost exposures. Thus, the positive-cost exposures are ordered from the smallest ratio to the largest ratio, and the negative-cost exposures are ordered from the most negative to the least negative ratio, as seen in V/C column 276.

Also introduced is the concept of cumulative data 270. Cumulative data 270 is illustrated with two values: cost 272 and VaR 274. Cumulative cost 272, or accumulated cost, is a running total of all associated costs 266, assuming all exposure reduction actions represented by hedge 260 are performed. Thus, cost 272 starts at zero (no action means no cost), grows to 274 for the cost of the USD-HKD hedge, to 7825 (274+7552) by adding the cost of the USD-PHP hedge, to 8955 (7825+1129) by adding the cost of the USD-CNY hedge, and so forth.

There is a cross-over point or inflection point between the USD-SGD currency exposure and the EUR-USD currency exposure. The inflection occurs due to the transition from positive-cost exposures to negative-cost exposures. After this point, the summed cost value subtracts from the earned income cost. However, it will be understood that for the data shown, a company could perform all exposure reduction actions up through the AUD-USD hedge without having to pay out any money, while still reducing VaR. Not until the last hedge is performed for USD-MXN does the cumulative cost 272 become net negative.

Cumulative data 270 includes cumulative VaR 274, which represents the cumulative remaining VaR. Thus, performing the USD-HKD hedge would reduce remaining VaR from the starting 8,625,302 value to 8,625,302 (i.e., subtracting the value of VaR 256 for the associated currency exposure). VaR 274 continues to reduce until it reaches zero for the last exposure reduction action.

FIG. 3A is an embodiment of an example of foreign currency exposure and hypothetical exposure reduction action data, including analytics data, where the data is unordered and all hypothetical exposure reduction actions have an associated net negative cost. Currency pair 310 identifies the various currency exposures in the received currency exposure data. In the example, there are eleven (11) currency exposures. In the case of FIG. 3A, there are only net negative costs. Thus, all currency exposures are negative-cost exposures, which corresponds to N=11 for purposes of calculations described herein.

Exposure data 320 includes first 322 and second 324 currencies, and gross VaR 326, similar to what is described above with respect to FIG. 2A. Similarly, hedge 330 includes first 332 and second 334 currencies and an associated exposure reducing action cost 336.

Traditional sorting techniques, if any were used, would recommend either performing the hedge associated with the largest VaR first, and down to the smallest until a tolerated risk is reached or a total cost is reached. Thus, a traditional VaR approach would suggest performing a hedge associated with the USD-THB currency exposure, followed by the EUR-USD currency exposure, the GBP-USD currency exposure, and so forth, A traditional cost approach would suggest performing a hedge associated first with the USD-IDR currency exposure, next the USD-DKK currency exposure, followed by the GBP-USD currency exposure, and so forth on to the highest cost hedge the company is willing to pay for (i.e., either to achieve a threshold VaR reduction, or to achieve a threshold total cost).

VaR to C 340 illustrates a VaR to cost ratio, which indicates VaR reduction efficiency. Thus, larger negative numbers in VaR to C 340 indicate more VaR reduction per unit cost. Ordering based on VaR to C 340 provides an ordering based on efficiency (or a "most bang for the buck") approach. Such an approach is illustrated in FIG. 3B.

FIG. 3B is an embodiment of an example of foreign currency exposure and hypothetical exposure reduction action data, including analytics data, where the data is ordered by a ratio of VaR to C and all hypothetical exposure reduction actions have an associated net negative cost. The output representation of FIG. 3B demonstrates sorted currency exposures. Ordered currency pair column 358 shows the same currency pairs of column 310 in FIG. 3A, but ordered based on Var to C 370. All information in exposure data 350 and its associated columns 352, 354, and 356, and in hedge data 360 and its associated columns 362, 364, and 366 are ordered in accordance with the associated currency exposure identifier shown in currency pair column 358.

Observe that sorting in one column naturally changes the ordering of associated columns. The rows of data are grouped. Cumulative data 380 can be appended or otherwise added to the rows of data. Cumulative data 380 includes accumulated cost 382 and cumulative remaining VaR 384. It will be observed that the first ordered currency is USD-DKK, which is not one of the first currencies suggest in either a cost-only or a VaR-only approach. However, VaR to C 370 of the USD-DKK currency exposure of 931.20, which is much higher than another other ratio in column 370.

Observe that performing the first four exposure reduction actions as ordered by VaR to C results in a cumulative cost of $11,951 (or 15.55% of the total cost to perform all exposure reduction actions) while reducing the total VaR by $5,104,603 (or 66.70% of the total VaR). Ordering the currency exposures by efficiency of VaR reduction can thus allow a company to make a more informed decision as to which actions would best help it meet it risk tolerances.

Figure 3C:
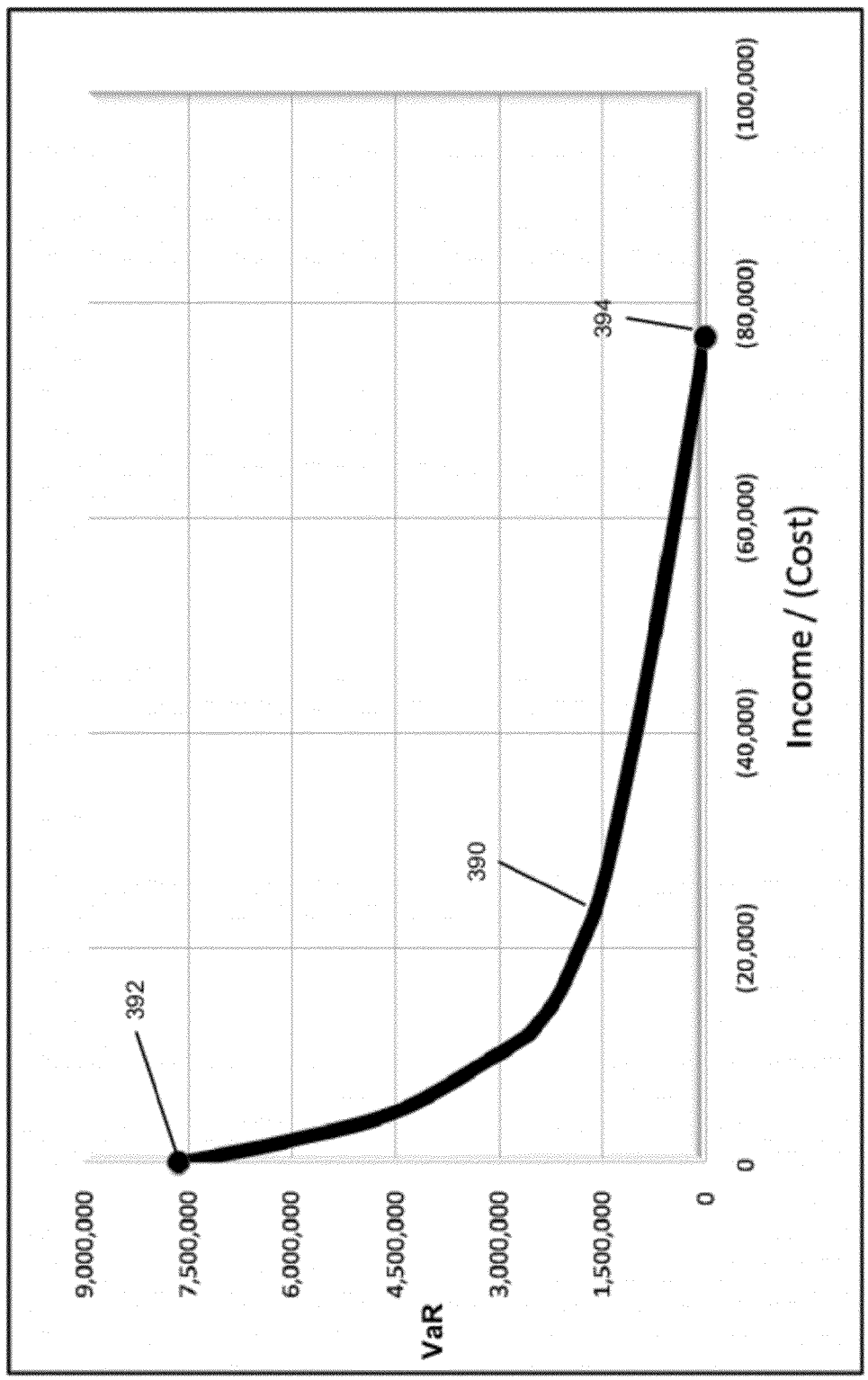
FIG. 3C is an embodiment of an example graphical representation of cumulative cost versus remaining risk for hypothetical exposure reduction actions having an associated net negative cost.

FIG. 3C is an embodiment of an example graphical representation of cumulative cost versus remaining risk for hypothetical exposure reduction actions having an associated net negative cost. The output representation of FIG. 3C is another form of output from what is already shown in FIG. 3B. In fact, curve 390 is an interpolated curve generated from plotting ordered pairs of total accumulated cost on the x-axis against total remaining VaR on the y-axis. In terms of the data representation of FIG. 3B, graph 390 is generated from an ordered pair of (column 382, column 384) for each of the ordered currency exposures 358. Point 392 is the starting point (net zero cost, total remaining VaR). Point 394 is the final point, which will always result in zero total remaining VaR when the hedges eliminate their associated currency exposure (i.e., reduce it to zero).

FIG. 4A is an embodiment of an example of foreign currency exposure and hypothetical exposure reduction action data, including analytics data, where the data is unordered and hypothetical exposure reduction actions have associated net negative or net positive costs. Exposure data 420 includes first 422 and second 424 currencies, and gross VaR 426, similar to what is described above with respect to FIG. 2A. Similarly, hedge 430 includes first 432 and second 434 currencies and an associated exposure reducing action cost 436.

VaR to C 440 illustrates a VaR to cost ratio computed for each negative-cost currency exposure 410. In one embodiment, ratio 440 is not computed for positive-cost currency exposures. It will be understood that if ratio 440 represents an efficiency of most VaR reduction per unit cost, the ratio has little to no practical meaning for net positive costs (at most the ratio could be used to show VaR reduction per unit income). For positive-cost currency exposures, it has been determined to make more sense to order the currency exposures by either cost or VaR.

FIG. 4B is an embodiment of an example of foreign currency exposure and hypothetical exposure reduction action data, including analytics data, where the data is ordered and hypothetical exposure reduction actions have associated net negative or net positive costs. In the output representation of FIG. 4B, negative-cost currency exposures are ordered by efficiency, by highest to lowest VaR to C ratio 470. Positive-cost currency exposures are ordered by cost 466, from highest income to lowest income.

Again, currency pair 458 illustrates a list of ordered currency exposures. Exposure data 450 includes first 452 and second 454 currencies related by an exchange rate, the exposure data having a VaR 456 associated with each currency exposure. Hedge data 460 represents an exposure elimination action, denominated with first 462 and second 464 currencies and an associated cost 466. Observe that darkened line marking the inflection point from positive-cost exposures to negative-cost exposures. Above the line cost 466 is the ordering parameter, while below the line ratio 470 is the ordering parameter.

Figure 4C:
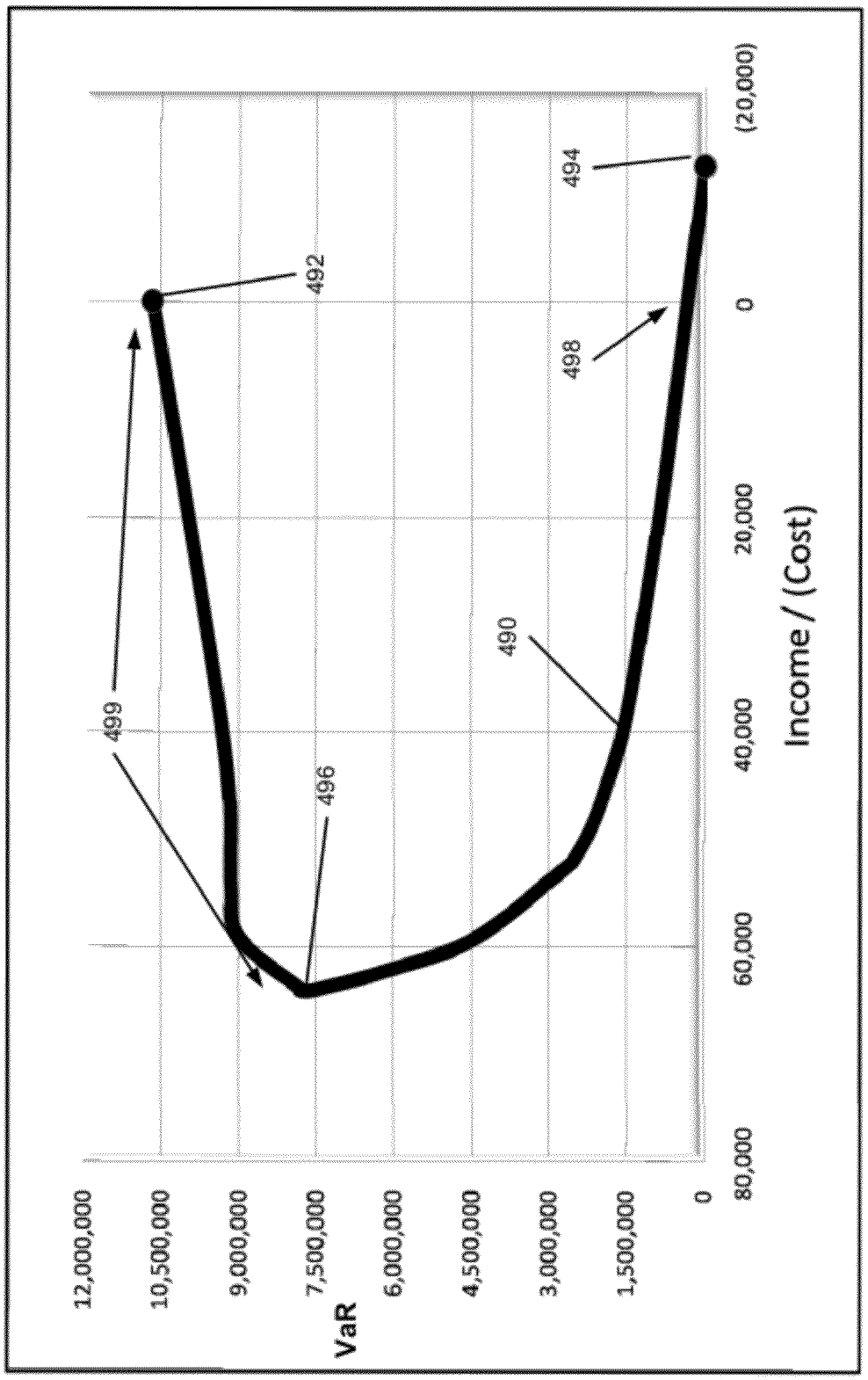
FIG. 4C is an embodiment of an example graphical representation of cumulative cost versus remaining risk for hypothetical exposure reduction actions with positive cost actions ordered by cost.

FIG. 4C is an embodiment of an example graphical representation of cumulative cost versus remaining risk for hypothetical exposure reduction actions with positive cost actions ordered by cost. The output representation of FIG. 4C is another form of output from what is already shown in FIG. 4B. Curve 490 is an interpolated curve generated from plotting ordered pairs derived from cumulative data points 480 (i.e., generating plot points (column 482, column 484)) for each of the ordered currency exposures 458. Point 492 is the starting point (net zero cost, total remaining VaR). Point 494 is the final point, where all VaR has been eliminated.

In one embodiment, additional information not seen on a curve of only negative-cost exposure reduction actions (such as illustrated in FIG. 3C) can be shown. For example, inflection point 496 demonstrates where on curve 490 the change occurs from plotting positive-cost currency exposure actions to plotting negative-cost currency exposure actions. In one embodiment, zero-cross point 498 is identified. It will be understood that an inflection point, zero-cross point, or any other specific point on the graph can be illustrated either by a point of different size and/or color, by an arrow or line, a box around the area, a shape, or other designator.

A zero-cross point indicates where in the sequence of exposure reduction actions the resulting actions would cross from a net accumulated positive cost to a net accumulated negative cost while reducing the value-at-risk. If a company took no action at all, its associated exposure reduction cost would be zero. If any exposure reduction actions are positive-cost, then at some action in the sequence of actions, the cost may cross back over the starting zero mark. Thus, a company could perform only positive-cost actions and make income while reducing exposure, or perform exposure reduction actions up to an action that is closest the zero-cross while having reduced exposure. It will be understood that the specific zero-cross point may be an interpolated point. To achieve the actual zero-cross point in reality, a company may have to hedge against some of an exposure. For example, from FIG. 4B, the company could perform all actions through hedging against all exposure through the USD-MXN exposure. If the company would like to achieve a net-zero cost reduction, it could then hedge against part of its AUD-USD exposure up to the point of $14,680 in cost (rather than hedging against the entire risk at a cost of $27,412).

In one embodiment, all positive-cost reduction actions can be identified, as illustrated by 499. The actions could be discretely identified by their discrete plot points, or the entire "positive-building" portion of curve 490 could be highlighted, colored, boxed, or otherwise identified.

FIG. 5A is an embodiment of an example of foreign currency exposure and hypothetical exposure reduction action data, including analytics data, where the data is ordered and hypothetical exposure reduction actions have associated net negative or net positive costs. In the output representation of FIG. 5A, negative-cost currency exposures are ordered by efficiency, by highest to lowest VaR to C ratio 570. Positive-cost currency exposures are ordered by VaR 556, from highest VaR reduction (USD-BRL at $1,219,870) to lowest VaR reduction (USD-HKD at $2,707, recalling that reference is made here only to positive-cost VaR reduction). It will be understood that FIG. 5A shows an ordering of the same data of FIG. 4A as shown ordered in FIG. 4B. However, the output representation illustrated in FIG. 4B demonstrates a cost-based positive-cost ordering, while the output representation illustrated in FIG. 5A demonstrates a VaR-reduction-based positive-cost ordering.

Again, currency pair 558 illustrates a list of ordered currency exposures. Exposure data 550 includes first 552 and second 554 currencies related by an exchange rate, the exposure data having a VaR 556 associated with each currency exposure. Fledge data 560 represents an exposure elimination action, denominated with first 562 and second 564 currencies and an associated cost 566. Again the darkened line marks the inflection point from positive-cost exposures to negative-cost exposures. Above the line VaR 556 is the ordering parameter, while below the line ratio 570 is the ordering parameter. Thus, below the darkened line, the output representation of FIG. 5A is identical to that of FIG. 4B below the line. Observe that the values for accumulated cost 582 and accumulated remaining VaR 584 of cumulative data 580 is the same for USD-DKK on both FIG. 5A and FIG. 4B, even though the currency exposures above it are ordered in different ways. The cumulative values will be the same for the same set of currency exposures.

Figure 5B:
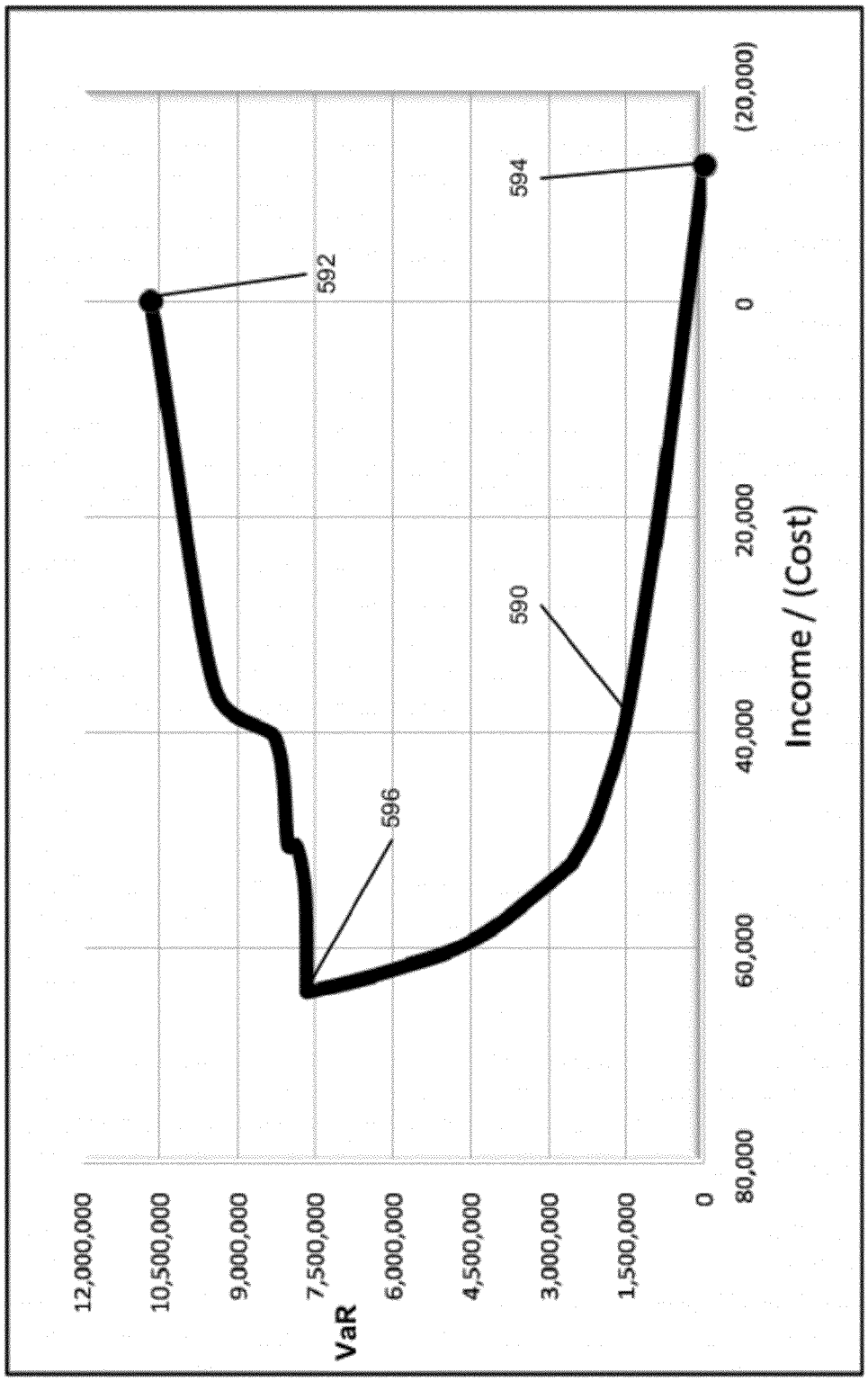
FIG. 5B is an embodiment of an example graphical representation of cumulative cost versus remaining risk for hypothetical exposure reduction actions with positive cost actions ordered by VaR.

FIG. 5B is an embodiment of an example graphical representation of cumulative cost versus remaining risk for hypothetical exposure reduction actions with positive cost actions ordered by VaR. The output representation of FIG. 5B is a graphical output representation based on the same data in the output representation of FIG. 5A. Curve 590 is an interpolated curve generated from plotting ordered pairs derived from cumulative data points 580 (i.e., generating plot points (column 582, column 584)) for each of the ordered currency exposures 558. Point 592 is the starting point (net zero cost, total remaining VaR). Point 594 is the final point, where all VaR has been eliminated. Point 596 illustrates the inflection point.

It will be observed that just as the data below the inflection point in FIGS. 4B and 5A is the same, a graphical representation of the data as shown in FIGS. 4C and 5B are likewise identical. Curve 590 from point 592 to point 596 is different from curve 490 from point 492 to point 496, in accordance with the different ordering.

Figure 6A:
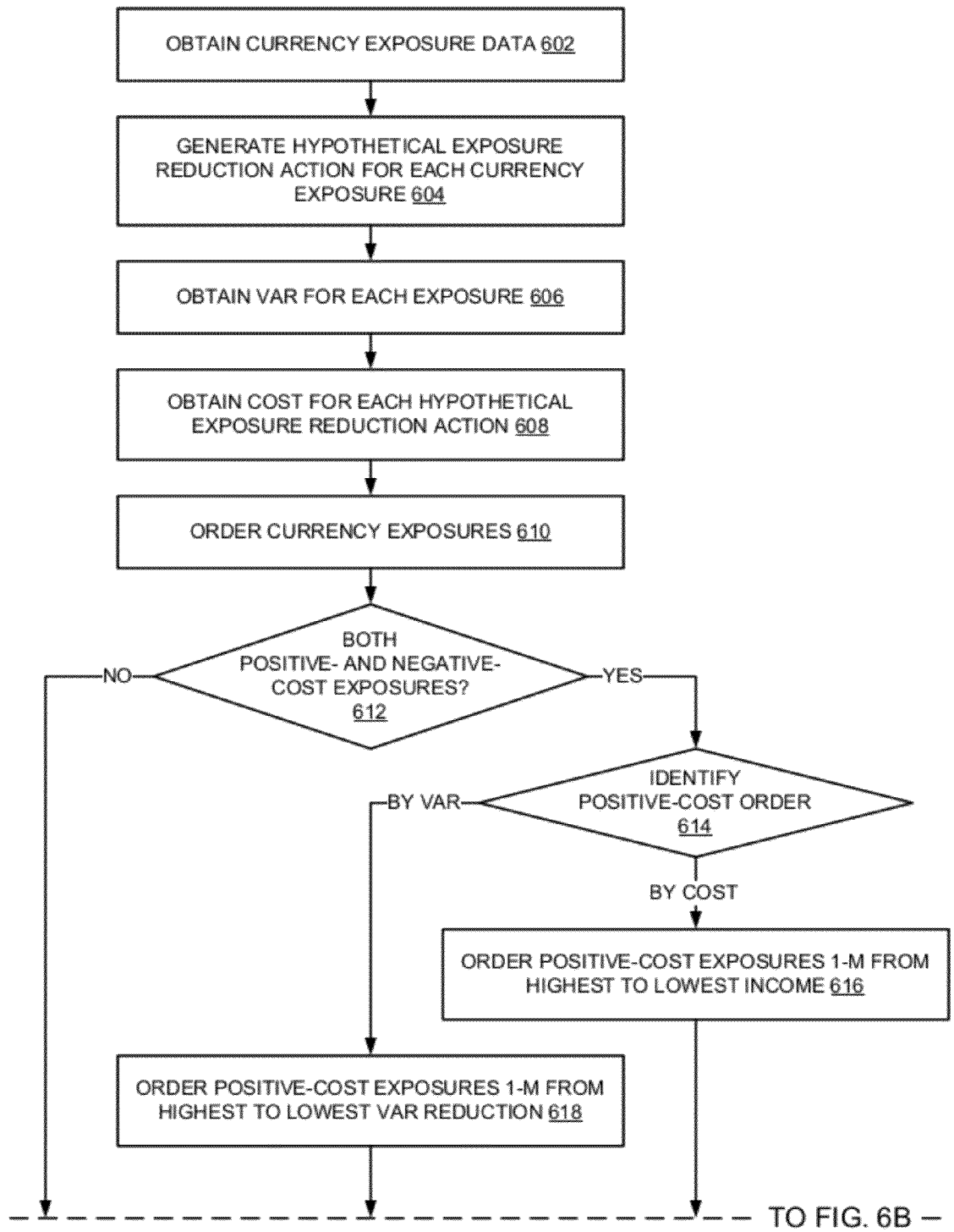
FIGS. 6A and 6B represent a flow diagram of an embodiment of a process for analyzing potential exposure reduction actions including generating a graphical representation of results of exposure reduction actions.
Figure 6B:
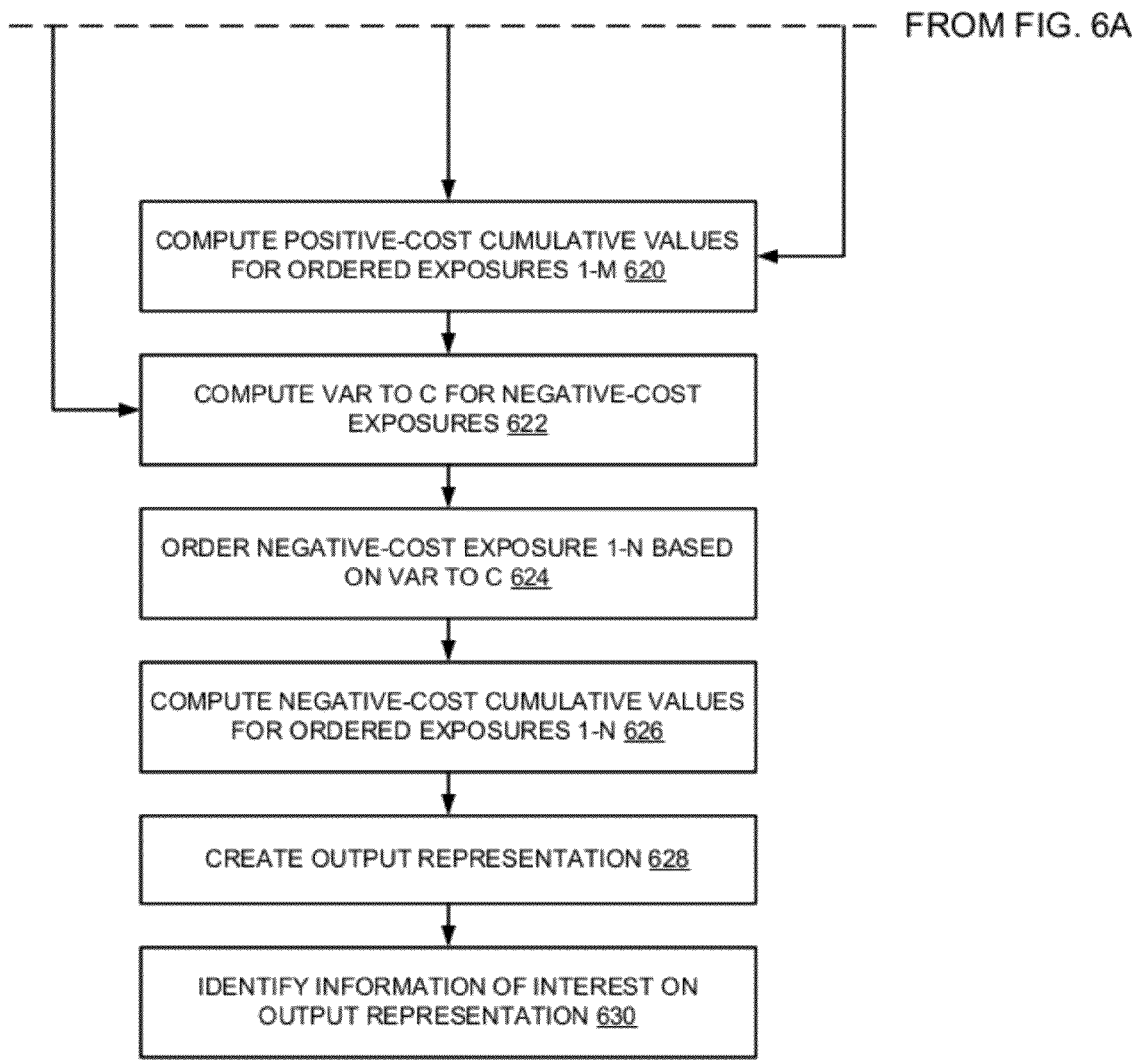

FIGS. 6A and 6B represent a flow diagram of an embodiment of a process for analyzing potential exposure reduction actions including generating a graphical representation of results of exposure reduction actions. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

All operations, unless otherwise indicated, are performed by an exposure analysis engine or analyzer for brevity. The analyzer obtains currency exposure data, 602, by accessing a backend system or by having data uploaded to it. The analyzer identifies all currency exposures in the exposure data and generates hypothetical exposure reduction actions to eliminate each identified currency exposure, 604.

The analyzer obtains VaR for each exposure, 606, for example, by either obtaining a value and/or computing a value. Obtaining VaR may include obtaining a computed value of gross VaR, or may include obtaining a volatility factor that can be used to compute the VaR. It will be understood that VaR could be computed for some currency exposures and accessed from storage for other currency exposures of the same currency exposure data. Similar to the VaR, the analyzer obtains a cost for each hypothetical exposure reduction action, 608, which may include accessing stored costs, receiving quotes, computing a cost, or some combination.

The analyzer orders the currency exposures, 610, in accordance with cost and VaR. In one embodiment, obtaining the VaR and the cost can be considered operations that are part of ordering the currency exposures. The analyzer determines whether the currency exposure data includes both positive-cost and negative-cost exposures, 612. If the currency exposure data only includes negative-cost exposures, the process follows the "No" branch to FIG. 6B.

If the currency exposure data include both positive-cost and negative-cost exposures, the analyzer identifies what ordering to use of positive-cost exposures, 614. It will be understood that the "Yes" branch from 612 would also be followed if there were only positive-cost exposures. However, such a case is explicitly described herein. If the positive-cost exposures are to be ordered by a cost-based parameter, the analyzer orders positive-cost exposures from 1-M from highest to lowest income, 616. If the positive-cost exposures are to be ordered by a VaR-based parameter, the analyzer orders the positive-cost exposures from 1-M from highest to lowest VaR reduction per exposure reduction action, 618.

Continuing to FIG. 6B, after ordering the positive-cost currency exposures, whether by cost or by VaR, the analyzer computes positive-cost cumulative values for the ordered exposures 1-M, 620. The cumulative values include a cumulative cost, assuming all preceding exposure reduction actions are performed, and summing the cost of the mth currency exposure reduction action with the cost of all preceding actions. Similarly, a cumulative remaining VaR is calculated by assuming all preceding exposure reduction actions are performed, and summing the VaR reduction of the mth currency exposure reduction action with the remaining VaR (which itself represents a sum of the total VaR minus the sum of all VaR reductions of all preceding currency exposure reduction actions).

Thus, the positive-cost currency exposures are ordered, and cumulative values generated for them. After ordering the positive-cost currency exposures, or after determining that no positive-cost currency exposure is included in the currency exposure data, the analyzer computes a VaR to C ratio for the negative-cost exposures, 622. The negative-cost exposures are ordered 1-N based on the computed ratio, 624.

The analyzer computes the negative-cost cumulative values for ordered exposures 1-N, 626. The cumulative values for the negative-cost exposures are computed in the same way as described above for the positive-cost exposures. It will be understood that all ordering can take place before any cumulative values are computed, or the cumulative values can be generated in combination with ordering. Thus, the analyzer could order all M+N currency exposures, and then generate the cumulative values. Alternatively, positive-cost currency exposures 1-M could be ordered and cumulative values generated for them prior to ordering the negative-cost exposures. Alternatively, each cumulative value could be computed in conjunction with each ordering determination.

The analyzer generates an output representation of the data, 628. The output representation can be generated as a list, a table, or a graph, or some combination. In one embodiment, the analyzer generates indicators to identify information of interest (e.g., zero-cross, inflection point, positive-cost actions) on the output representation, 630.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable medium may cause a machine to perform the functions or operations described, and includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer implemented method for accounting data management comprising:
    obtaining foreign currency exposure data for a company having exposure in multiple currencies;
    generating a hypothetical exposure reduction action for each currency exposure to eliminate the currency exposure;
    obtaining a numeric representation for a value-at-risk (VaR) for each foreign currency exposure, the VaR being an amount having exposure adjusted by a volatility value for the currency pair of the currency exposure;
    obtaining a numeric representation for a cost (C) to implement each hypothetical exposure reduction action;
    for a number N of currency exposures having an associated hypothetical exposure reduction action with a net negative cost (C):
        computing an associated ratio of VaR to C for each currency exposure;
        ordering currency exposures 1 through N based on their associated ratios from largest negative to smallest negative;
        determining a starting total VaR and a starting C for the N ordered currency exposures; and
        computing cumulative values for each of the currency exposures ordered 1 through N, each nth currency exposure including a cumulative remaining VaR equaling a sum of the total starting VaR and a VaR reduction of the nth currency exposure and VaR reductions for all preceding currency exposures, and a cumulative C equaling a sum of the starting C and the C of the nth currency exposure and the Cs of all preceding currency exposures; and
    creating an output representation of cumulative remaining value-at-risk versus accumulated cost from the computed cumulative values.

2. The method of claim 1, further comprising:
    ordering currency exposures for currency exposures having an associated hypothetical exposure reduction action with net positive cost (C); and
    computing cumulative values for each of the currency exposures having associated hypothetical exposure reduction actions with net positive cost (C), the cumulative values including a cumulative VaR and a cumulative C for each currency exposure.

3. The method of claim 2, wherein the N currency exposures are negative-cost currency exposures and the cumulative values are negative-cost cumulative values, wherein the ordering and the computing further comprise:
    for a number M of currency exposures having an associated hypothetical exposure reduction action with a net positive cost (C),
        ordering currency exposures 1 through M from highest to lowest net positive C;
        determining a starting positive-cost total VaR and a starting positive-cost C for the M ordered currency exposures; and
        computing positive-cost cumulative values for each of the currency exposures ordered 1 through M, each mth currency exposure including a positive-cost cumulative remaining VaR equaling a sum of the starting positive-cost total VaR and a VaR reduction of the mth currency exposure and VaR reductions for all preceding positive-cost currency exposures, and a positive-cost cumulative C equaling a sum of the starting positive-cost C and the C of the mth currency exposure and the Cs of all preceding positive-cost currency exposures; and wherein the starting negative-cost total VaR and starting negative-cost C comprise, respectively, the positive-cost cumulative remaining VaR and the positive-cost cumulative C for ordered currency exposure M; and wherein creating the output representation further comprises:

creating an output representation of cumulative remaining value-at-risk versus accumulated cost from the positive-cost cumulative values, and then from the negative-cost cumulative values.

4. The method of claim 3, wherein creating the output representation of cumulative remaining value-at-risk versus accumulated cost further comprises:

generating an output graph, including for the M positive-cost currency exposures:

generating a positive-cost starting plot point from the determined starting positive-cost total VaR and starting positive-cost C for the M ordered currency exposures; and generating subsequent positive-cost plot points for currency exposures ordered 1 through M, each mth positive-cost plot point to plot a sum of the total starting positive-cost VaR and VaR reduction of the mth currency exposure and VaR reductions for all preceding positive-cost currency exposures, against a sum of the starting positive-cost C and the C of the mth currency exposure and the Cs of all preceding positive-cost currency exposures;

for the N negative-cost currency exposures, where the positive-cost plot point for currency exposure M is a starting negative-cost plot point, and where the total starting negative-cost VaR is the total remaining VaR of currency exposure M and the starting negative-cost C is the accumulated total C of currency exposure M:

generating negative-cost plot points for currency exposures ordered 1 through N, each nth negative-cost plot point to plot a sum of the total starting negative-cost VaR and VaR reduction of the nth currency exposure and VaR reductions for all preceding negative-cost currency exposures, against a sum of the starting negative-cost C and the C of the nth currency exposure and the Cs of all preceding negative-cost currency exposures; and creating a graphical representation of cumulative remaining value-at-risk versus accumulated cost from the positive-cost and negative-cost plot points to graphically compare potential exposure reduction actions.

5. The method of claim 2, wherein the N currency exposures are negative-cost currency exposures and the plot points are negative-cost plot points, wherein the ordering and the generating further comprise:

for a number M of currency exposures having an associated hypothetical exposure reduction action with a net positive cost (C), ordering currency exposures 1 through M from highest to lowest VaR;

determining a starting positive-cost total VaR and a starting positive-cost C for the M ordered currency exposures; and computing positive-cost cumulative values for each of the currency exposures ordered 1 through M, each mth currency exposure including a positive-cost cumulative remaining VaR equaling a sum of the starting positive-cost total VaR and a VaR reduction of the mth currency exposure and VaR reductions for all preceding positive-cost currency exposures, and a positive-cost cumulative C equaling a sum of the starting positive-cost C and the C of the mth currency exposure and the Cs of all preceding positive-cost currency exposures; and wherein the starting negative-cost total VaR and starting negative-cost C comprise, respectively, the positive-cost cumulative remaining VaR and the positive-cost cumulative C for ordered currency exposure M; and wherein creating the output representation further comprises:

creating an output representation of cumulative remaining value-at-risk versus cost from the positive-cost cumulative values, and then from the negative-cost cumulative values.

6. The method of claim 5, wherein creating the output representation of cumulative remaining value-at-risk versus accumulated cost further comprises:

generating an output graph, including for the M positive-cost currency exposures:

generating a positive-cost starting plot point from the determined starting positive-cost total VaR and starting positive-cost C for the M ordered currency exposures; and generating subsequent positive-cost plot points for currency exposures ordered 1 through M, each mth positive-cost plot point to plot a sum of the total starting positive-cost VaR and VaR reduction of the mth currency exposure and VaR reductions for all preceding positive-cost currency exposures, against a sum of the starting positive-cost C and the C of the mth currency exposure and the Cs of all preceding positive-cost currency exposures;

for the N negative-cost currency exposures, where the positive-cost plot point for currency exposure M is a starting negative-cost plot point, and where the total starting negative-cost VaR is the total remaining VaR of currency exposure M and the starting negative-cost C is the accumulated total C of currency exposure M:

generating negative-cost plot points for currency exposures ordered 1 through N, each nth negative-cost plot point to plot a sum of the total starting negative-cost VaR and VaR reduction of the nth currency exposure and VaR reductions for all preceding negative-cost currency exposures, against a sum of the starting negative-cost C and the C of the nth currency exposure and the Cs of all preceding negative-cost currency exposures; and creating a graphical representation of cumulative remaining value-at-risk versus accumulated cost from the positive-cost and negative-cost plot points to graphically compare potential exposure reduction actions.

7. The method of claim 2, wherein creating the output representation of cumulative remaining value-at-risk versus accumulated cost further comprises:

identifying any zero-cross points in the output representation indicating what sequence of exposure reduction actions would result in zero net accumulated cost while reducing the value-at-risk.

8. The method of claim 2, wherein creating the output representation of cumulative remaining value-at-risk versus accumulated cost further comprises:

identifying in the output representation any positive-cost exposure reduction actions indicating any exposure reduction actions that would result in a net positive income while reducing value-at-risk.

9. The method of claim 1, wherein creating the output representation of cumulative remaining value-at-risk versus accumulated cost further comprises:
generating one of an output graph, output table, or output list based on the ordering and the computed cumulative values.

10. The method of claim 9, wherein generating the output graph further comprises: for the N currency exposures:
generating a starting plot point from the determined starting total VaR and starting C for the N ordered currency exposures; and
generating subsequent plot points for currency exposures ordered 1 through N, each nth plot point to plot a sum of the total starting VaR and VaR reduction of the nth currency exposure and VaR reductions for all preceding currency exposures, against a sum of the starting C and the C of the nth currency exposure and the Cs of all preceding currency exposures; and
creating a graphical representation of cumulative remaining value-at-risk versus accumulated cost from the plot points to graphically compare potential exposure reduction actions.

11. The method of claim 1, wherein obtaining the numeric representation for the VaR comprises:
accessing a stored VaR value for at least one currency exposure.

12. The method of claim 1, wherein obtaining the numeric representation for the VaR comprises:
computing the VaR for at least one currency exposure by summing all data having exposure in a first currency with respect to a second currency or exposure in the second currency with respect to the first currency and multiplying its numeric value by an associated risk factor for the currency pair.

13. The method of claim 1, wherein obtaining the numeric representation for the cost comprises:
accessing a quoted cost value for at least one currency exposure.

14. The method of claim 1, wherein obtaining the numeric representation for the cost comprises:
computing the cost for at least one currency exposure.

15. The method of claim 1, wherein generating the hypothetical exposure reduction action to eliminate the currency exposure comprises:
generating a hypothetical exposure reduction action for the currency exposure.

16. The method of claim 1, wherein generating the hypothetical exposure reduction action to eliminate the currency exposure comprises:
generating one or more hypothetical derivative instruments for the currency exposure.

17. The method of claim 1, wherein ordering the currency exposures based on their associated ratios comprises:
computing an associated ratio $$\frac{VaR}{C}$$

for each currency exposure; and
ordering currency exposures by associated ratios in order from highest to lowest, indicating highest risk reduction per cost per exposure reduction action.

18. The method of claim 1, wherein computing the cumulative values comprises:
computing, for each nth ordered currency exposure, $$\sum_{n=1}^{N} VaR_n \text{ and } \sum_{n=1}^{N} C_n;$$

and
generating cumulative values for each nth currency exposure as $$\left( VaR_{Total} - \sum_{n=1}^{N} VaR_n \right)$$

for the cumulative remaining VaR, where $VaR_{Total}$ represents the starting VaR, and $$\left( \sum_{n=1}^{N} C_n \right)$$

for the cumulative C.

19. The method of claim 18, wherein creating the output representation of cumulative remaining value-at-risk versus accumulated cost further comprises:
generating an output graph based on output plot points, where each nth plot point is generated as $$\left( \left( VaR_{Total} - \sum_{n=1}^{N} VaR_n \right), \sum_{n=1}^{N} C_n \right).$$

20. The method of claim 1, wherein the currency exposure data for the company comprises transaction data, the transaction data having a value of each transaction denominated in a currency, each transaction having an associated structured electronic currency exposure representation including
a currency pair indicator identifying a currency exposure between a first currency, the currency in which the transaction is denominated, and a second currency different from the first currency, the first and second currencies related by an exchange rate,
an obtained value obtained from the value of the transaction denominated in the transaction data, and
a derived value not in the transaction data, obtained by calculating a numeric equivalent of the obtained value in the second currency based on the exchange rate;
wherein the currency pair indicator is unique for all currency exposures having either the obtained value or the derived value denominated in the first currency, and the other of the obtained value or the derived value denominated in the second currency; and
wherein the exposure transaction data has a number of currency exposures identifiable by each unique currency exposure pair indicator.

21. The method of claim 1, wherein the currency exposure data for the company comprises forecast data, each currency exposure being a prospective currency exposure based on prospective transaction data.

22. An article of manufacture comprising a computer readable storage medium having content stored thereon to provide instructions to cause a machine to perform operations including:

obtaining foreign currency exposure data for a company having exposure in multiple currencies;

generating a hypothetical exposure reduction action for each currency exposure to eliminate the currency exposure;

obtaining a numeric representation for a value-at-risk (VaR) for each foreign currency exposure, the VaR being an amount having exposure adjusted by a volatility value for the currency pair of the currency exposure;

obtaining a numeric representation for a cost (C) to implement each hypothetical exposure reduction action;

for a number N of currency exposures having an associated hypothetical exposure reduction action with a net negative cost (C):

computing an associated ratio of VaR to C for each currency exposure;

ordering currency exposures 1 through N based on their associated ratios from largest negative to smallest negative;

determining a starting total VaR and a starting C for the N ordered currency exposures; and computing cumulative values for each of the currency exposures ordered 1 through N, each nth currency exposure including a cumulative remaining VaR equaling a sum of the total starting VaR and a VaR reduction of the nth currency exposure and VaR reductions for all preceding currency exposures, and a cumulative C equaling a sum of the starting C and the C of the nth currency exposure and the Cs of all preceding currency exposures; and creating an output representation of cumulative remaining value-at-risk versus accumulated cost from the computed cumulative values.

23. The article of manufacture of claim 22, wherein the N currency exposures are negative-cost currency exposures and the plot points are negative-cost plot points, further comprising content to provide instructions for:

for a number M of any currency exposures having an associated hypothetical exposure reduction action with a net positive cost (C), ordering currency exposures 1 through M from highest to lowest net positive C;

determining a starting positive-cost total VaR and a starting positive-cost C for the M ordered currency exposures; and computing positive-cost cumulative values for each of the currency exposures ordered 1 through M, each mth currency exposure including a positive-cost cumulative VaR equaling a sum of the starting positive-cost total VaR and a VaR reduction of the mth currency exposure and VaR reductions for all preceding positive-cost currency exposures, and a positive-cost cumulative C equaling a sum of the starting positive-cost C and the C of the mth currency exposure and the Cs of all preceding positive-cost currency exposures; and wherein the starting negative-cost total VaR and starting negative-cost C comprise, respectively, the positive-cost cumulative VaR and the positive-cost cumulative C for ordered currency exposure M; and wherein the content to provide instructions for creating the output representation further comprises content to provide instructions for creating an output representation of value-at-risk versus cost from the positive-cost cumulative values, and then from the negative-cost cumulative values.

24. The article of manufacture of claim 23, wherein the content to provide instructions for creating the output representation of cumulative remaining value-at-risk versus accumulated cost further comprises content to provide instructions for generating an output graph, including for the M positive-cost currency exposures:

generating a positive-cost starting plot point from the determined starting positive-cost total VaR and starting positive-cost C for the NI ordered currency exposures; and generating subsequent positive-cost plot points for currency exposures ordered 1 through M, each mth positive-cost plot point to plot a sum of the total starting positive-cost VaR and VaR reduction of the mth currency exposure and VaR reductions for all preceding positive-cost currency exposures, against a sum of the starting positive-cost C and the C of the mth currency exposure and the Cs of all preceding positive-cost currency exposures;

for the N negative-cost currency exposures, where the positive-cost plot point for currency exposure M is a starting negative-cost plot point, and where the total starting negative-cost VaR is the total remaining VaR of currency exposure M and the starting negative-cost C is the accumulated total C of currency exposure M:

generating negative-cost plot points for currency exposures ordered 1 through N, each nth negative-cost plot point to plot a sum of the total starting negative-cost VaR and VaR reduction of the nth currency exposure and VaR reductions for all preceding negative-cost currency exposures, against a sum of the starting negative-cost C and the C of the nth currency exposure and the Cu of all preceding negative-cost currency exposures; and creating a graphical representation of cumulative remaining value-at-risk versus accumulated cost from the positive-cost and negative-cost plot points to graphically compare potential exposure reduction actions.

25. The article of manufacture of claim 22, wherein the N currency exposures are negative-cost currency exposures and the plot points are negative-cost plot points, further comprising content to provide instructions for:

for a number M of any currency exposures having an associated hypothetical exposure reduction action with a net positive cost (C), ordering currency exposures 1 through M from highest to lowest VaR;

determining a starting positive-cost total VaR and a starting positive-cost C for the M ordered currency exposures; and computing positive-cost cumulative values for each of the currency exposures ordered 1 through M, each mth currency exposure including a positive-cost cumulative VaR equaling a sum of the starting positive-cost total VaR and a VaR reduction of the mth currency exposure and VaR reductions for all preceding positive-cost currency exposures, and a positive-cost cumulative C equaling a sum of the starting positive-cost C and the C of the mth currency exposure and the Cs of all preceding positive-cost currency exposures; and wherein the starting negative-cost total VaR and starting negative-cost C comprise, respectively, the positive-cost cumulative VaR and the positive-cost cumulative C for ordered currency exposure M; and wherein the content to provide instructions for creating the output representation further comprises content to provide instructions for creating an output representation of value-at-risk versus cost from the positive-cost cumulative values, and then from the negative-cost cumulative values.

26. The article of manufacture of claim 25, wherein the content to provide instructions for creating the output representation of cumulative remaining value-at-risk versus accumulated cost further comprises content to provide instructions for generating an output graph, including for the M positive-cost currency exposures:

generating a positive-cost starting plot point from the determined starting positive-cost total VaR and starting positive-cost C for the M ordered currency exposures; and generating subsequent positive-cost plot points for currency exposures ordered 1 through M, each mth positive-cost plot point to plot a sum of the total starting positive-cost VaR and VaR reduction of the mth currency exposure and VaR reductions for all preceding positive-cost currency exposures, against a sum of the starting positive-cost C and the C of the mth currency exposure and the Cs of all preceding positive-cost currency exposures;

for the N negative-cost currency exposures, where the positive-cost plot point for currency exposure M is a starting negative-cost plot point, and where the total starting negative-cost VaR is the total remaining VaR of currency exposure NI and the sta negative-cost C is the accumulated total C of currency exposure M:

generating negative-cost plot points for currency exposures ordered 1 through N, each nth negative-cost plot point to plot a sum of the total starting negative-cost VaR and VaR reduction of the nth currency exposure and VaR reductions for all preceding negative-cost currency exposures, against a sum of the starting negative-cost C and the C of the nth currency exposure and the Cs of all preceding negative-cost currency exposures; and creating a graphical representation of cumulative remaining value-at-risk versus accumulated cost from the positive-cost and negative-cost plot points to graphically compare potential exposure reduction actions.

27. The article of manufacture of claim 22, wherein the content to provide instructions for ordering the currency exposures based on their ratios comprises content to provide instructions for computing an associated ratio $$\frac{VaR}{C}$$

for each currency exposure; and ordering currency exposures by associated ratios in order from highest to lowest, indicating highest risk reduction per cost per exposure reduction action; and wherein the content to provide instructions for computing the cumulative values comprises content to provide instructions for computing, for each nth ordered currency exposure, $$\sum_{n=1}^{N} VaR_n \text{ and } \sum_{n=1}^{N} C_n;$$

and generating cumulative values for each nth currency exposure as $$\left( VaR_{Total} - \sum_{n=1}^{N} VaR_n \right)$$

for the cumulative VaR, where $VaR_{Total}$ represents the starting VaR, and $$\left( \sum_{n=1}^{N} C_n \right)$$

for the cumulative C.

* * * * *